(12) United States Patent
Niida

(10) Patent No.: US 9,516,240 B2
(45) Date of Patent: *Dec. 6, 2016

(54) IMAGING APPARATUS, CLIENT DEVICE, IMAGING SYSTEM, CONTROL METHOD OF IMAGING APPARATUS, CONTROL METHOD OF CLIENT DEVICE, AND CONTROL METHOD OF IMAGING SYSTEM

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,863

(22) Filed: Jan. 12, 2016

(65) Prior Publication Data

US 2016/0127627 A1 May 5, 2016

Related U.S. Application Data

(63) Continuation of application No. 14/402,072, filed as application No. PCT/JP2013/003010 on May 10, 2013, now Pat. No. 9,270,896.

(30) Foreign Application Priority Data

May 21, 2012 (JP) .................................. 2012-115700
Mar. 1, 2013 (JP) .................................. 2013-041155

(51) Int. Cl.
H04N 5/235 (2006.01)
H04N 5/238 (2006.01)
(Continued)

(52) U.S. Cl.
CPC ............... *H04N 5/238* (2013.01); *G03B 11/00* (2013.01); *H04N 1/00204* (2013.01); *H04N 5/2254* (2013.01); *H04N 5/2351* (2013.01); *H04N 5/23206* (2013.01); *H04N 5/23245* (2013.01);
(Continued)

(58) Field of Classification Search
None
See application file for complete search history.

(56) References Cited

U.S. PATENT DOCUMENTS 4,437,111 A 3/1984 Inai
4,695,878 A 9/1987 Levine
(Continued)

FOREIGN PATENT DOCUMENTS

| EA | 13800 B1 | 6/2010 |
| EP | 1551172 A2 | 7/2005 |
| RU | 78337 U1 | 11/2008 |
| WO | 01-16649 A1 | 3/2001 |

*Primary Examiner* — Twyler Haskins
*Assistant Examiner* — Angel L Garces-Rivera
(74) *Attorney, Agent, or Firm* — Canon USA, Inc. IP Division

(57) ABSTRACT

An imaging apparatus is connected to a client device and has an infrared cut filter to cut infrared light, a toggling unit to toggle an infrared cut filter state between on and off, and reception, control, and transmission units. The reception unit receives automatic adjustment information relating to the state, along with an imaging setting command for the imaging apparatus to automatically control the state. The control unit automatically controls the toggling unit based on the imaging setting command. The transmission unit transmits setting information relating to the automatic adjustment information to the client device. The setting information transmitted by the transmission unit indicates whether automatic adjustment information used by the control unit can be set in each of a case where the state is turned on to enable the infrared cut filter or a case where the state is turned off to disable the infrared cut filter.

20 Claims, 14 Drawing Sheets

(51) Int. Cl.
*G03B 11/00* (2006.01)
*H04N 5/225* (2006.01)
*H04N 5/232* (2006.01)
*H04N 1/00* (2006.01)
*G03B 17/12* (2006.01)

(52) U.S. Cl.
CPC ....... *G03B 17/12* (2013.01); *H04N 2201/0084* (2013.01)

(56) References Cited

U.S. PATENT DOCUMENTS

| | | | |
|---|---|---|---|
| 8,159,533 | B2 | 4/2012 | Cheng |
| 9,270,896 | B2 * | 2/2016 | Niida .................. H04N 5/2254 348/164 |
| 2008/0143868 | A1 | 6/2008 | Tsuchiya |
| 2009/0009655 | A1 | 1/2009 | Suda |

* cited by examiner

FIG. 2A
```
<xs:complexType name="ImagingSettings20">
    <xs:sequence>
        <xs:element name="Brightness" type="tt:FloatRange" minOccurs="0"/>
        <xs:element name="Contrast" type="tt:FloatRange" minOccurs="0"/>
        <xs:element name="IrCutFilterModes" type="tt:IrCutFilterMode" minOccurs="0" maxOccurs="unbounded"/>
        <xs:element name="Sharpness" type="tt:FloatRange" minOccurs="0"/>
        <xs:element name="WhiteBalance" type="tt:WhiteBalanceOptions20" minOccurs="0"/>
        .....
    </xs:sequence>
    <xs:anyAttribute processContents="lax"/>
</xs:complexType>
```

FIG. 2B
```
<xs:simpleType name="IrCutFilterMode">
    <xs:restriction base="xs:string">
        <xs:enumeration value="ON"/>
        <xs:enumeration value="OFF"/>
        <xs:enumeration value="AUTO"/>
    </xs:restriction>
</xs:simpleType>
```

FIG. 2C
```
<xs:element name="IrCutFilterAutoAdjustment" type="tt:IrCutFilterAutoAdjustment" minOccurs="0" maxOccurs="2" />
```

FIG. 2D
```
<xs:complexType name="IrCutFilterAutoAdjustment">
    <xs:sequence>
        <xs:element name="BoundaryType" type="tt:IrCutFilterAutoBoundaryType" />
        <xs:element name="BrightnessOffset" type="xs:float" minOccurs="0" />
        <xs:element name="ResponseTime" type="xs:duration" minOccurs="0" />
    </xs:sequence>
</xs:complexType>
```

FIG. 2E
```
<xs:simpleType name="IrCutFilterAutoBoundaryType">
    <xs:restriction base="xs:string">
        <xs:enumeration value="Common" />
        <xs:enumeration value="Off"/>
        <xs:enumeration value="On"/>
        <xs:enumeration value="Extended"/>
    </xs:restriction>
</xs:simpleType>
```

FIG. 3A

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>Off</BoundaryType>
                <BrightnessOffset>3</BrightnessOffset>
                <ResponseTime>PT1M30S</ResponseTime>
            </IrCutFilterAutoAdjustment>
        </ImagingSettings>
        <ForcePersistence>false</ForcePersistence>
    </SetImagingSettings>
</s:Body>
```

FIG. 3B

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>On</BoundaryType>
                <BrightnessOffset>2.5</BrightnessOffset>
            </IrCutFilterAutoAdjustment>
        </ImagingSettings>
        <ForcePersistence>false</ForcePersistence>
    </SetImagingSettings>
</s:Body>
```

FIG. 3C

```
<s:Body
xmlns:xsi="http://www.w3.org/2001/XMLSchema-instance"
xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>Common</BoundaryType>
                        </IrCutFilterAutoAdjustment>
                </ImagingSettings>
                <ForcePersistence>false</ForcePersistence>
        </SetImagingSettings>
</s:Body>
```

FIG. 3D

```
<s:Body
xmlns:xsi="http://www.w3.org/2001/XMLSchema-instance"
xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                </ImagingSettings>
                <ForcePersistence>false</ForcePersistence>
        </SetImagingSettings>
</s:Body>
```

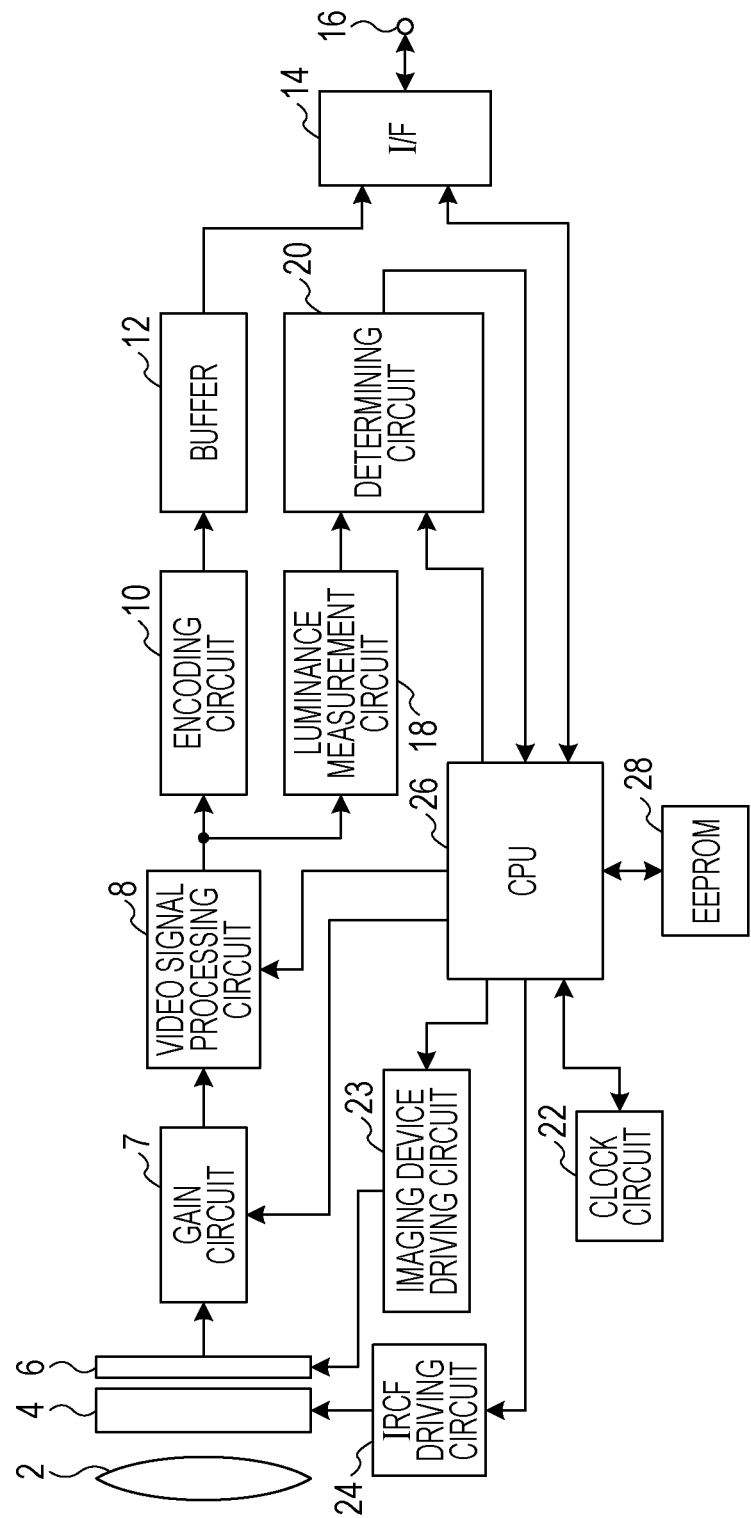

FIG. 7A

```
<xs:complexType name="ImagingSettings20">
    <xs:sequence>
        <xs:element name="Brightness" type="tt:FloatRange" minOccurs="0"/>
        <xs:element name="Contrast" type="tt:FloatRange" minOccurs="0"/>
        <xs:element name="IrCutFilterModes" type="tt:IrCutFilterMode" minOccurs="0" maxOccurs="unbounded"/>
        <xs:element name="Sharpness" type="tt:FloatRange" minOccurs="0"/>
        <xs:element name="WhiteBalance" type="tt:WhiteBalanceOptions20" minOccurs="0"/>
        .....
    </xs:sequence>
    <xs:anyAttribute processContents="lax"/>
</xs:complexType>
```

FIG. 7B

```
<xs:simpleType name="IrCutFilterMode">
    <xs:restriction base="xs:string">
        <xs:enumeration value="ON"/>
        <xs:enumeration value="OFF"/>
        <xs:enumeration value="AUTO"/>
    </xs:restriction>
</xs:simpleType>
```

FIG. 7C

```
<xs:element name="IrCutFilterAutoAdjustment" type="tt:IrCutFilterAutoAdjustment" minOccurs="0" maxOccurs="2" />
```

FIG. 7D

```
<xs:complexType name="IrCutFilterAutoAdjustment">
    <xs:sequence>
        <xs:element name="BoundaryType" type="tt:IrCutFilterAutoBoundaryType" />
        <xs:element name="BrightnessOffset" type="xs:float" minOccurs="0" />
        <xs:element name="ResponseTime" type="xs:duration" minOccurs="0" />
    </xs:sequence>
</xs:complexType>
```

FIG. 7E

```
<xs:simpleType name="IrCutFilterAutoBoundaryType">
    <xs:restriction base="xs:string">
        <xs:enumeration value="Common" />
        <xs:enumeration value="ToOn"/>
        <xs:enumeration value="ToOff"/>
        <xs:enumeration value="Extended"/>
    </xs:restriction>
</xs:simpleType>
```

FIG. 8A

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOff</BoundaryType>
                <BoundaryOffset>-0.52</BoundaryOffset>
                <ResponseTime>PT1M30S</ResponseTime>
            </IrCutFilterAutoAdjustment>
        </ImagingSettings>
        <ForcePersistence>false</ForcePersistence>
    </SetImagingSettings>
</s:Body>
```

FIG. 8B

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOn</BoundaryType>
                <BoundaryOffset>0.65</BoundaryOffset>
                <ResponseTime>PT1M10S</ResponseTime>
            </IrCutFilterAutoAdjustment>
        </ImagingSettings>
        <ForcePersistence>false</ForcePersistence>
    </SetImagingSettings>
</s:Body>
```

FIG. 8C

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>Common</BoundaryType>
                <BoundaryOffset>0.52</BoundaryOffset>
                <ResponseTime>PT1M15S</ResponseTime>
            </IrCutFilterAutoAdjustment>
        </ImagingSettings>
        <ForcePersistence>false</ForcePersistence>
    </SetImagingSettings>
</s:Body>
```

FIG. 8D

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
        </ImagingSettings>
        <ForcePersistence>false</ForcePersistence>
    </SetImagingSettings>
</s:Body>
```

FIG. 8E

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            ON
            </IrCutFilter>
        </ImagingSettings>
        <ForcePersistence>false</ForcePersistence>
    </SetImagingSettings>
</s:Body>
```

FIG. 8F

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            OFF
            </IrCutFilter>
        </ImagingSettings>
        <ForcePersistence>false</ForcePersistence>
    </SetImagingSettings>
</s:Body>
```

FIG. 8G

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOn</BoundaryType>
                <BoundaryOffset>0.16</BoundaryOffset>
                <ResponseTime>PT1M30S</ResponseTime>
            </IrCutFilterAutoAdjustment>
            <IrCutFilterAutoAdjustment>
                <BoundaryType>ToOff</BoundaryType>
                <BoundaryOffset>-0.62</BoundaryOffset>
                <ResponseTime>PT1M10S</ResponseTime>
            </IrCutFilterAutoAdjustment>
        </ImagingSettings>
        <ForcePersistence>false</ForcePersistence>
    </SetImagingSettings>
</s:Body>
```

FIG. 10A

```
<s:Body
xmlns:xsi="http://www.w3.org/2001/XMLSchema-instance"
xmlns:xsd="http://www.w3.org/2001/XMLSchema">
    <GetOptions xmlns="http://www.onvif.org/ver20/imaging/wsdl">
        <VideoSourceToken>0</VideoSourceToken>
    </GetOptions>
</s:Body>
```

FIG. 10B

```
<s:Body
xmlns:xsi="http://www.w3.org/2001/XMLSchema-instance"
xmlns:xsd="http://www.w3.org/2001/XMLSchema"
xmlns:img20="http://www.onvif.org/ver20/schema">
    <GetOptionsResponse xmlns="http://www.onvif.org/ver20/imaging/wsdl">
        <ImagingOptions20>
            ......
            <img20:IrCutFilterModes>ON</img20:IrCutFilterModes>
            <img20:IrCutFilterModes>OFF</img20:IrCutFilterModes>
            <img20:IrCutFilterModes>AUTO</img20:IrCutFilterModes>
            ......
        </ImagingOptions20>
        <ImagingOptions20Extention>
            ......
            <ImagingOptions20Extention2>
                <IrCutFilterAutoAdjustmentOptions>
                    <img20:Modes>Common</img20:Mode>
                    <img20:BoundaryOffset>true</img20:BoundaryOffset>
                    <img20:ResponseTime>
                        <img20:Min>PT0S</img20:Min>
                        <img20:Max>PT30M</img20:Max>
                    </img20:ResponseTime>
                </IrCutFilterAutoAdjustment>
            </ImagingOptions20Extention>
            ......
            </ImagingOptions20Extention2>
    </GetOptionsResponse>
</s:Body>
```

FIG. 10C

```
<s:Body
xmlns:xsi="http://www.w3.org/2001/XMLSchema-instance"
xmlns:xsd="http://www.w3.org/2001/XMLSchema">
xmlns:img20="http://www.onvif.org/ver20/schema">
        <GetOptionsResponse xmlns="http://www.onvif.org/ver20/imaging/wsdl">
                <ImagingOptions20>
                ......
                        <img20:IrCutFilterModes>ON</img20:IrCutFilterModes>
                        <img20:IrCutFilterModes>OFF</img20:IrCutFilterModes>
                        <img20:IrCutFilterModes>AUTO</img20:IrCutFilterModes>
                ......
                </ImagingOptions20>
                <ImagingOptions20Extention>
                ......
                <ImagingOptions20Extention2>
                        <IrCutFilterAutoAdjustmentOptions>
                                <img20:Modes>ToOn</img20:Mode>
                                <img20:Modes>ToOff</img20:Mode>
                                <img20:BoundaryOffset>true</img20:BoundaryOffset>
                                <img20:ResponseTime>
                                        <img20:Min>PT0S</img20:Min>
                                        <img20:Max>PT30M</img20:Max>
                                </img20:ResponseTime>
                        </IrCutFilterAutoAdjustment>
                </ImagingOptions20Extention>
                ......
                </ImagingOptions20Extention2>
        </GetOptionsResponse>
</s:Body>
```

IMAGING APPARATUS, CLIENT DEVICE, IMAGING SYSTEM, CONTROL METHOD OF IMAGING APPARATUS, CONTROL METHOD OF CLIENT DEVICE, AND CONTROL METHOD OF IMAGING SYSTEM

CROSS REFERENCE TO RELATED APPLICATIONS

The present application is a continuation of U.S. patent application Ser. No. 14/402,072, filed on Nov. 18, 2014, which is a National Stage Entry of PCT/JP2013/003010, filed May 10, 2013 and which claims priority from Japanese Patent Application No. 2012-115700, filed May 21, 2012, and Japanese Patent Application No. 2013-041155, filed Mar. 1, 2013, all of which are hereby incorporated by reference herein in their entirety.

BACKGROUND OF THE INVENTION

Field of the Invention

The present invention relates to an imaging apparatus of which operations differ between a case of imaging a bright subject and a case of imaging a dark subject, and a control method thereof.

Description of the Related Art

Conventionally, there has been known an imaging apparatus configured such that an infrared cut filter can be inserted into and retracted from the optical path of the imaging optical system, enabling visible light shooting and infrared shooting.

With such an imaging apparatus, the configuration normally is such that when the infrared cut filter is inserted into the optical path of the imaging optical system, imaging is performed with visible light, and when the infrared cut filter is retracted the optical path, imaging is performed with infrared light. Also, with such an imaging device, the imaging apparatus itself determines how bright the surroundings are, and controls whether the infrared cut filter is to inserted into or retracted from the imaging optical system optical path (PTL 1).

Also, as network technology has rapidly advanced, there is a growing demand by users to control the imaging apparatus from an external control device via network through a network interface provided to the imaging apparatus. Insertion/retraction control of the infrared cut filter into and from the imaging optical system optical path is no exception. There has been user demand to enable settings via network as described above, such that the imaging apparatus automatically controls insertion and retraction of the infrared cut filter to and from the imaging optical system optical path.

CITATION LIST

Patent Literature

[PTL 1]
Japanese Patent Laid-Open No. 7-107355

SUMMARY OF THE INVENTION

However, with the conventional example described above, there has been a problem in that control, such that the imaging apparatus automatically performs insertion and retraction of the infrared cut filter, cannot be performed from an external client device via network.

Also, there can be conceived user demands to additionally set a delay time and the brightness of the surroundings regarding insertion and retraction of the infrared cut filter, in order to perform insertion and retraction of the infrared cut filter when performing settings for the imaging apparatus to automatically control insertion and retraction of the infrared cut filter.

However, in such a case, it can be supposed that the user has to intentionally consider the existence of delay time and the brightness of the surroundings regarding insertion and retraction of the infrared cut filter described above, when setting the automatic control of insertion and retraction of the infrared cut filter. This leads to problems in that user operations may become more troublesome.

For example, it is difficult to the user operating the client device to understand how the additional information such as the delay time and the brightness of the surroundings regarding insertion and retraction of the infrared cut filter will be used at the imaging apparatus to which the client device is connected, making user operations troublesome.

Also, there can be conceived an imaging apparatus which automatically selects between a first imaging mode for imaging a bright subject and a second imaging mode for imaging a dark subject. Even with such an imaging apparatus, the user has to intentionally consider the existence of the brightness of the surroundings and the delay time relating to selection of the imaging mode when setting the automatic selection of the imaging mode, so user operations may become more troublesome.

The present invention has been made in light of the above points. Provided is a client device connected to an imaging apparatus via network, with which cases where the imaging apparatus uses additional information related to insertion and retraction of the infrared cut filter are comprehended, whereby user operability can be improved.

Also provided is an imaging apparatus connected to a client device via network, which causes the client device to comprehend cases where the imaging apparatus uses additional information related to insertion and retraction of the infrared cut filter, whereby user operability can be improved.

Also provided is an imaging system which causes a client device connected to an imaging apparatus via network to comprehend cases where the imaging apparatus uses additional information related to insertion and retraction of the infrared cut filter, thereby improving user operability.

According to an aspect of the present invention, an imaging apparatus connected to a client device via a network includes an infrared cut filter configured to cut infrared light, a toggling unit configured to toggle a state of the infrared cut filter between on and off, a reception unit configured to receive, from the client device via the network, automatic adjustment information relating to the state of the infrared cut filter, along with an imaging setting command for the imaging apparatus to automatically control the state of the infrared cut filter, a control unit configured to automatically control the toggling unit based on the imaging setting command received by the reception unit, and a transmission unit configured to transmit setting information relating to the automatic adjustment information to the client device via the network, wherein the setting information transmitted by the transmission unit indicates whether automatic adjustment information used by the control unit can be set in each of a case where the state of the infrared cut filter is turned on to enable the infrared cut filter or a case where the state of the infrared cut filter is turned off to disable the infrared cut filter.

According to an aspect of the present invention, a client device is connected via a network to an imaging apparatus which includes an infrared cut filter configured to cut infrared light, a toggling unit configured to toggle a state of the infrared cut filter between on and off, and a control unit configured to automatically control the toggling unit. The client device includes a transmission unit configured to transmit, to the imaging apparatus via the network, automatic adjustment information relating to the state of the infrared cut filter, along with an imaging setting command for the imaging apparatus to automatically control the state of the infrared cut filter, and an acquisition unit configured to acquire, from the imaging apparatus via the network, setting information relating to the automatic adjustment information used by the control unit, wherein the setting information acquired by the acquisition unit indicates whether automatic adjustment information used by the control unit can be set in each of a case where the state of the infrared cut filter is turned on to enable the infrared cut filter or a case where the state of the infrared cut filter is turned off to disable the infrared cut filter.

Also, the present invention provides a client device connected via a network to an imaging apparatus which includes an imaging optical system, an imaging unit configured to image an image of a subject formed by the imaging optical system, an infrared cut filter configured to cut infrared light, an insertion/retraction unit configured to insertion and retraction the infrared cut filter to and from an optical path of the imaging optical system, and a control unit configured to automatically control the insertion/retraction unit, the client device including: a transmission unit configured to transmit, to the external imaging apparatus via the network, automatic adjustment information relating to insertion/retraction of the infrared cut filter, along with an automatic insertion/retraction control command for the imaging apparatus to automatically control insertion/retraction of the infrared cut filter by the insertion/retraction unit; and an acquisition unit configured to acquire insertion/retraction specifying information relating to the automatic adjustment information used by the control unit, from the external imaging apparatus via the network; wherein the insertion/retraction specifying information acquired by the acquisition unit indicates whether or not automatic adjustment information used by the control unit can be specified for each of a case where the infrared cut filter is inserted into the optical path and a case where the infrared cut filter is retracted from the optical path.

According to an aspect of the present invention, an imaging system includes an imaging apparatus having: an infrared cut filter configured to cut infrared light, a toggling unit configured to toggle a state of the infrared cut filter between on and off, a reception unit configured to receive, from a client device via a network, automatic adjustment information relating to the state of the infrared cut filter, along with an imaging setting command for the imaging apparatus to automatically control the state of the infrared cut filter, and a control unit configured to automatically control the toggling unit based on the imaging setting command received by the reception unit, and having the client device connected to the imaging apparatus via the network and including: an acquisition unit configured to acquire setting information relating to the automatic adjustment information used by the control unit, from the imaging apparatus via the network, wherein the setting information acquired by the acquisition unit indicates whether automatic adjustment information used by the control unit can be set in each of a case where the state of the infrared cut filter is turned on to enable the infrared cut filter or a case where the state of the infrared cut filter is turned off to disable the infrared cut filter.

Also, the present invention provides an imaging system configured of an imaging apparatus, and a client device connected to the imaging apparatus via a network; the imaging apparatus including an imaging optical system, an imaging unit configured to image an image of a subject formed by the imaging optical system, an infrared cut filter configured to cut infrared light, an insertion/retraction unit configured to insertion and retraction the infrared cut filter to and from an optical path of the imaging optical system, a reception unit configured to receive, from the client device via the network, automatic adjustment information relating to insertion/retraction of the infrared cut filter, along with an automatic insertion/retraction control command for the imaging apparatus to automatically control insertion/retraction of the infrared cut filter by the insertion/retraction unit, and a control unit configured to automatically control the insertion/retraction unit, based on the automatic insertion/retraction command received by the reception unit and automatic adjustment information; and the client device including an acquisition unit configured to acquire insertion/retraction specifying information relating to the automatic adjustment information used by the control unit, from the imaging apparatus via the network; wherein the insertion/retraction specifying information indicates whether or not automatic adjustment information used by the control unit can be specified for each of a case where the infrared cut filter is inserted into the optical path and a case where the infrared cut filter is retracted from the optical path.

Also, the present invention provides a control method of an imaging apparatus which includes an imaging optical system, an imaging unit configured to image an image of a subject formed by the imaging optical system, an infrared cut filter configured to cut infrared light, an insertion/retraction unit configured to insertion and retraction the infrared cut filter to and from an optical path of the imaging optical system, and a control unit configured to automatically control the insertion/retraction unit, connected to an external client device via a network, the method including: a reception step to receive, from the external client device via the network, automatic adjustment information relating to insertion/retraction of the infrared cut filter, along with an automatic insertion/retraction control command for the imaging apparatus to automatically control insertion/retraction of the infrared cut filter by the insertion/retraction unit; a control step to automatically control the insertion/retraction unit, based on the automatic insertion/retraction command received in the reception step; and a transmission step to transmit insertion/retraction specifying information relating to the automatic adjustment information to the external client via the network; wherein the insertion/retraction specifying information transmitted in the transmission step indicates whether or not automatic adjustment information used by the control unit can be specified for each of a case where the infrared cut filter is inserted into the optical path and a case where the infrared cut filter is retracted from the optical path.

Also, the present invention provides a control method of a client device connected via a network to an imaging apparatus which includes an imaging optical system, an external imaging unit configured to image an image of a subject formed by the imaging optical system, an infrared cut filter configured to cut infrared light, an insertion/retraction unit configured to insertion and retraction the infrared cut filter to and from an optical path of the imaging optical system, and a control unit configured to automatically control the insertion/retraction unit, the method including: a transmission step to transmit, to the external imaging apparatus via the network, automatic adjustment information relating to insertion/retraction of the infrared cut filter, along with an automatic insertion/retraction control command for the imaging apparatus to automatically control insertion/retraction of the infrared cut filter by the insertion/retraction unit; and an acquisition step to acquire insertion/retraction specifying information relating to the automatic adjustment information used by the control unit, from the external imaging apparatus via the network; wherein the insertion/retraction specifying information acquired in the acquisition step indicates whether or not automatic adjustment information used by the control unit can be specified for each of a case where the infrared cut filter is inserted into the optical path and a case where the infrared cut filter is retracted from the optical path.

Also, the present invention provides a control method of an imaging system configured of an imaging apparatus, and a client device connected to the imaging apparatus via a network, the imaging apparatus including an imaging optical system, an imaging unit configured to image an image of a subject formed by the imaging optical system, an infrared cut filter configured to cut infrared light, and an insertion/retraction unit configured to insertion and retraction the infrared cut filter to and from an optical path of the imaging optical system, the method including, at the imaging apparatus, a reception step to receive, from the client device via the network, automatic adjustment information relating to insertion/retraction of the infrared cut filter, along with an automatic insertion/retraction control command for the imaging apparatus to automatically control insertion/retraction of the infrared cut filter by the insertion/retraction unit; and a control step to automatically control the insertion/retraction unit, based on the automatic insertion/retraction command and automatic adjustment information received in the reception step; and at the client device, an acquisition step to acquire insertion/retraction specifying information relating to the automatic adjustment information used in the control step, from the imaging apparatus via the network; wherein the insertion/retraction specifying information indicates whether or not automatic adjustment information used in the control step can be specified for each of a case where the infrared cut filter is inserted into the optical path and a case where the infrared cut filter is retracted from the optical path.

Also, the present invention provides an imaging apparatus including: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control insertion/retraction of the infrared cut filter; and a determining unit configured to determine whether or not the third command includes additional information based on the output of the reception unit; wherein, in the event that the determining unit has determined that the third command includes additional information, the control unit controls insertion/retraction of the infrared cut filter based on the additional information, and in the event that the determining unit has determined that the third command does not include additional information, the control unit controls insertion/retraction of the infrared cut filter based on control information which the control unit has beforehand.

Also, the present invention provides an imaging apparatus including: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control insertion of the infrared cut filter into the optical path; and a determining unit configured to determine whether or not the third command includes additional information based on the output of the reception unit; wherein, in the event that the determining unit has determined that the third command includes additional information, the control unit controls insertion of the infrared cut filter based on the additional information, and in the event that the determining unit has determined that the third command does not include additional information, the control unit controls insertion of the infrared cut filter based on control information which the control unit has beforehand.

Also, the present invention provides an imaging apparatus including: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control retraction of the infrared cut filter from the optical path; and a determining unit configured to determine whether or not the third command includes additional information based on the output of the reception unit; wherein, in the event that the determining unit has determined that the third command includes additional information, the control unit controls retraction of the infrared cut filter based on the additional information, and in the event that the determining unit has determined that the third command does not include additional information, the control unit controls retraction of the infrared cut filter based on control information which the control unit has beforehand.

Also, the present invention provides an imaging apparatus which performs transmission/reception of data according to ONVIF specifications, and has a first imaging mode to image a bright subject and a second imaging mode to image a dark subject, the imaging apparatus including: a reception unit configured to receive a SetImagingSettings command of which a value of an IrCutFilter field has been set to AUTO, which is a command to cause the imaging apparatus to automatically control insertion/retraction of an infrared cut filter into and from an optical path of an imaging optical system to the imaging apparatus; an Adjustment field determining unit configured to determine whether or not an IrCutFilterAutoAdjustment field is included in the received SetImagingSettings command; and a selecting unit configured to select between the first imaging mode and the second imaging mode; wherein, in the event that the Adjustment field determining unit determines that the IrCutFilterAutoAdjustment field is included, the selecting unit selects the first imaging mode or the second imaging mode, in accordance with the luminance of the subject and the value of a BoundaryOffset field included in the IrCutFilterAutoAdjustment field.

Also, the present invention provides a control method of an imaging apparatus which performs transmission/reception of data according to ONVIF specifications, and has a first imaging mode to image a bright subject and a second imaging mode to image a dark subject, the method including: a reception step to receive a SetImagingSettings command of which a value of an IrCutFilter field has been set to AUTO, which is a command to cause the imaging apparatus to automatically control insertion/retraction of an infrared cut filter into and from an optical path of an imaging optical system to the imaging apparatus; an Adjustment field determining step to determine whether or not an IrCutFilterAutoAdjustment field is included in the received SetImagingSettings command; and a selecting step to select between the first imaging mode and the second imaging mode; wherein, in the event that determination has been made in the Adjustment field determining step that the IrCutFilterAutoAdjustment field is included, the first imaging mode or the second imaging mode is selected, in accordance with the luminance of the subject and the value of a BoundaryOffset field included in the IrCutFilterAutoAdjustment field.

According to an embodiment of the present invention, an imaging apparatus includes: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control insertion/retraction of the infrared cut filter; and a determining unit configured to determine whether or not the third command includes additional information based on the output of the reception unit; wherein, in the event that the determining unit has determined that the third command includes additional information, the control unit controls insertion/retraction of the infrared cut filter based on the additional information, and in the event that the determining unit has determined that the third command does not include additional information, the control unit controls insertion/retraction of the infrared cut filter based on control information which the control unit has beforehand.

The imaging apparatus may further include: a photometry unit to perform photometry of the subject luminance; wherein the additional information of the third command includes threshold value information of the subject luminance, and the control unit controls insertion/retraction of the infrared cut filter based on the output of the photometry unit and the threshold value information.

The imaging apparatus may further include: a clock unit configured to measure elapsing of time; wherein the additional information of the third command includes response time information, and the control unit effects control so as to delay insertion/retraction of the infrared cut filter based on the output of the clock unit and the response time information.

According to an embodiment of the present invention, an imaging apparatus includes: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control insertion of the infrared cut filter into the optical path; and a determining unit configured to determine whether or not the third command includes additional information based on the output of the reception unit; wherein, in the event that the determining unit has determined that the third command includes additional information, the control unit controls insertion of the infrared cut filter based on the additional information, and in the event that the determining unit has determined that the third command does not include additional information, the control unit controls insertion of the infrared cut filter based on control information which the control unit has beforehand.

The imaging apparatus may further include: a photometry unit to perform photometry of the subject luminance; wherein the additional information of the third command includes threshold value information of the subject luminance, and the control unit controls insertion of the infrared cut filter based on the output of the photometry unit and the threshold value information.

The imaging apparatus may further include: a clock unit configured to measure elapsing of time; wherein the additional information of the third command includes response time information, and the control unit effects control so as to delay insertion of the infrared cut filter based on the output of the clock unit and the response time information.

According to an embodiment of the present invention, an imaging apparatus includes: an imaging optical system; an imaging unit; a control unit configured to perform insertion/retraction of an infrared cut filter into and from an optical path of the imaging optical system; a reception unit configured to receive a first command to insert the infrared cut filter into the optical path of the imaging optical system, a second command to retract the infrared cut filter from the optical path of the imaging optical system, and a third command to cause the control unit to automatically control retraction of the infrared cut filter from the optical path; and a determining unit configured to determine whether or not the third command includes additional information based on the output of the reception unit; wherein, in the event that the determining unit has determined that the third command includes additional information, the control unit controls retraction of the infrared cut filter based on the additional information, and in the event that the determining unit has determined that the third command does not include additional information, the control unit controls retraction of the infrared cut filter based on control information which the control unit has beforehand.

The imaging apparatus may further include: a photometry unit to perform photometry of the subject luminance; wherein the additional information of the third command includes threshold value information of the subject luminance, and the control unit controls retraction of the infrared cut filter based on the output of the photometry unit and the threshold value information.

The imaging apparatus may further include: a clock unit configured to measure elapsing of time; wherein the additional information of the third command includes response time information, and the control unit effects control so as to delay retraction of the infrared cut filter based on the output of the clock unit and the response time information.

According to an embodiment of the present invention, an imaging apparatus which performs transmission/reception of data according to ONVIF specifications, and has a first imaging mode to image a bright subject and a second imaging mode to image a dark subject, includes: a reception unit configured to receive a SetImagingSettings command of which a value of an IrCutFilter field has been set to AUTO, which is a command to cause the imaging apparatus to automatically control insertion/retraction of an infrared cut filter into and from an optical path of an imaging optical system to the imaging apparatus; an Adjustment field determining unit configured to determine whether or not an IrCutFilterAutoAdjustment field is included in the received SetImagingSettings command; and a selecting unit configured to select between the first imaging mode and the second imaging mode; wherein, in the event that the Adjustment field determining unit determines that the IrCutFilterAutoAdjustment field is included, the selecting unit selects the first imaging mode or the second imaging mode, in accordance with the luminance of the subject and the value of a BoundaryOffset field included in the IrCutFilterAutoAdjustment field.

The reception unit may receive a SetImagingSettings command of which a value of the IrCutFilter field has been set to On, which is a command to cause the imaging apparatus to place the infrared cut filter in the optical path of the imaging optical system, and in the event that reception unit receives a SetImagingSettings command of which a value of the IrCutFilter field has been set to On, the selecting unit may select the first imaging mode.

The reception unit may receive a SetImagingSettings command of which a value of the IrCutFilter field has been set to Off, which is a command to cause the imaging apparatus to place the infrared cut filter out of the optical path of the imaging optical system, and in the event that reception unit receives a SetImagingSettings command of which a value of the IrCutFilter field has been set to Off, the selecting unit may select the second imaging mode.

In the event that the Adjustment field determining unit determines that the IrCutFilterAutoAdjustment field is not included, the selecting unit may select the first imaging mode or the second imaging mode, in accordance with the luminance and a predetermined threshold value.

In the event that the Adjustment field determining unit determines that the IrCutFilterAutoAdjustment field is not included, and the luminance value is higher than a predetermined threshold value, the selecting unit may select the first imaging mode.

In the event that the Adjustment field determining unit determines that the IrCutFilterAutoAdjustment field is not included, and the luminance value is not higher than a predetermined threshold value, the selecting unit may select the second imaging mode.

The imaging apparatus may further include: a threshold value unit configured to obtain a threshold value in accordance with the value of the BoundaryOffset field; wherein, in the event that the value of the BoundaryType field is On, and the luminance value is higher than the obtained threshold value, the selecting unit may select the first imaging mode.

In the event that the value of the BoundaryType field is On, and the luminance value is not higher than the obtained threshold value, the selecting unit may select the second imaging mode.

In the event that the value of the BoundaryType field is Off, and the luminance value is lower than the obtained threshold value, the selecting unit may select the second imaging mode.

In the event that the value of the BoundaryType field is Common, and the luminance value is higher than the obtained threshold value, the selecting unit may select the first imaging mode.

In the event that the value of the BoundaryType field is Common, and the luminance value is lower than the obtained threshold value, the selecting unit may select the second imaging mode.

The value of the BoundaryType field may be one of On, Off, Common, and Extended.

The range of the value of the BoundaryType field may be restricted to between −1 and 1.

The imaging apparatus may further include: a ResponseTime field determining unit configured to determine whether or not a ResponseTime field is included in the IrCutFilterAutoAdjustment field; and a threshold value unit configured to obtain a threshold value in accordance with the value of the BoundaryOffset field; wherein, in the event that the ResponseTime field determining unit determines that a ResponseTime field is included, and the value of the BoundaryType field is On, and the time over which the value of the luminance is maintained at a higher state than the obtained threshold value is longer than the time indicated in the ResponseTime field, the selecting unit may select the first imaging mode.

In the event that the ResponseTime field determining unit determines that a ResponseTime field is included, and the value of the BoundaryType field is On, and the time over which the value of the luminance is maintained at a higher state than the obtained threshold value is not longer than the time indicated in the ResponseTime field, the selecting unit may maintain the current imaging mode selected by the selecting unit.

In the event that the ResponseTime field determining unit determines that a ResponseTime field is included, and the value of the BoundaryType field is Off, and the time over which the value of the luminance is maintained at a lower state than the obtained threshold value is longer than the time indicated in the ResponseTime field, the selecting unit may select the second imaging mode.

In the event that the ResponseTime field determining unit determines that a ResponseTime field is included, and the value of the BoundaryType field is Off, and the time over which the value of the luminance is maintained at a lower state than the obtained threshold value is not longer than the time indicated in the ResponseTime field, the selecting unit may maintain the current imaging mode selected by the selecting unit.

In the event that the ResponseTime field determining unit determines that a ResponseTime field is included, and the value of the BoundaryType field is Common, and the time over which the value of the luminance is maintained at a higher state than the obtained threshold value is longer than the time indicated in the ResponseTime field, the selecting unit may select the first imaging mode.

In the event that the ResponseTime field determining unit determines that a ResponseTime field is included, and the value of the BoundaryType field is Common, and the time over which the value of the luminance is maintained at a higher state than the obtained threshold value is not longer than the time indicated in the ResponseTime field, the selecting unit may maintain the current imaging mode selected by the selecting unit.

In the event that the ResponseTime field determining unit determines that a ResponseTime field is included, and the value of the BoundaryType field is Common, and the time over which the value of the luminance is maintained at a lower state than the obtained threshold value is longer than the time indicated in the ResponseTime field, the selecting unit may select the second imaging mode.

In the event that the ResponseTime field determining unit determines that a ResponseTime field is included, and the value of the BoundaryType field is Common, and the time over which the value of the luminance is maintained at a lower state than the obtained threshold value is not longer than the time indicated in the ResponseTime field, the selecting unit may maintain the current imaging mode selected by the selecting unit.

The threshold value unit may obtain the threshold value by adding the value of the BoundaryOffset field the predetermined threshold value.

The imaging apparatus may further include: a storage unit configured to store a plurality of the predetermined threshold values and values of the BoundaryOffset field corresponding to each of said predetermined threshold values; wherein the threshold value unit obtains a threshold value by reading out from the storage unit the predetermined threshold value corresponding to the value of the BoundaryOffset field included in the IrCutFilterAutoAdjustment field.

The imaging apparatus may further include: an imaging optical system; an imaging unit configured to image an image of a subject formed by the imaging optical system; and an infrared cut filter configured to cut infrared light; wherein the first imaging mode is a mode in which imaging is performed in a state with the infrared cut filter placed within the optical path of the imaging optical system, and the second imaging mode is a mode in which imaging is performed in a state with the infrared cut filter placed outside of the optical path of the imaging optical system.

The imaging apparatus may further include: an imaging optical system; an imaging unit configured to image an image of a subject formed by the imaging optical system; and a video signal processing unit configured to process video signals output from the imaging unit; wherein the second imaging mode is a mode in which the video signal processing unit operates so as to raise gain as to the video signals higher than with the first imaging mode.

The imaging apparatus may further include: an imaging optical system; an imaging unit configured to image an image of a subject formed by the imaging optical system; and a white balance adjusting unit configured to adjust the white balance of video signals output from the imaging unit; wherein the second imaging mode is a mode in which the white balance adjusting unit operates so as to amplify the gain of each color of the video signals greater than with the first imaging mode.

The imaging apparatus may be a network camera.

The imaging apparatus may be a Network Video Transmitter.

According to an embodiment of the present invention, a control method of an imaging apparatus which performs transmission/reception of data according to ONVIF specifications, and has a first imaging mode to image a bright subject and a second imaging mode to image a dark subject, includes: a reception step to receive a SetImagingSettings command of which a value of an IrCutFilter field has been set to AUTO, which is a command to cause the imaging apparatus to automatically control insertion/retraction of an infrared cut filter into and from an optical path of an imaging optical system to the imaging apparatus; an Adjustment field determining step to determine whether or not an IrCutFilterAutoAdjustment field is included in the received SetImagingSettings command; and a selecting step to select between the first imaging mode and the second imaging mode; wherein, in the event that determination is made in the Adjustment field determining step that the IrCutFilterAutoAdjustment field is included, the first imaging mode or the second imaging mode is selected in the selecting step, in accordance with the luminance of the subject and the value of a BoundaryOffset field included in the IrCutFilterAutoAdjustment field.

Advantageous Effects of Invention

According to the present invention, provided is a client device connected to an imaging apparatus via network, with which cases where the imaging apparatus uses additional information related to insertion and retraction of the infrared cut filter are comprehended, whereby user operability can be improved.

Also, according to the present invention, an imaging apparatus such as follows can be provided. That is to say, an imaging apparatus connected to a client via network causes the client device to comprehend cases where the imaging apparatus uses additional information related to insertion and retraction of the infrared cut filter, whereby user operability can be improved.

Also according to the present invention, an imaging system such as follows can be provided. That is to say, an imaging system causes a client device connected to an imaging apparatus via network to comprehend cases where the imaging apparatus uses additional information related to insertion and retraction of the infrared cut filter.

Also according to the present invention, an advantage can be had in that the imaging apparatus can be controlled from an external client device so as to automatically perform insertion and retraction of the infrared cut filter.

Also according to the present invention, the need for the user to intentionally consider the additional existence of delay time regarding the brightness of the surroundings and insertion and retraction of the infrared cut filter (or selection of imaging mode), is reduced, so there is the advantage the user operability increases.

Further features of the present invention will become apparent from the following description of exemplary embodiments with reference to the attached drawings.

BRIEF DESCRIPTION OF THE DRAWINGS

FIG. 2A is a diagram illustrating a data structure used with commands which the imaging apparatus according to an embodiment of the present invention receives.

FIG. 2B is a diagram illustrating a data structure used with commands which the imaging apparatus according to an embodiment of the present invention receives.

FIG. 2C is a diagram illustrating a data structure used with commands which the imaging apparatus according to an embodiment of the present invention receives.

FIG. 2D is a diagram illustrating a data structure used with commands which the imaging apparatus according to an embodiment of the present invention receives.

FIG. 2E is a diagram illustrating a data structure used with commands which the imaging apparatus according to an embodiment of the present invention receives.

FIG. 3A is a diagram illustrating a configuration example of commands which the imaging apparatus according to an embodiment of the present invention receives.

FIG. 3B is a diagram illustrating a configuration example of commands which the imaging apparatus according to an embodiment of the present invention receives.

FIG. 3C is a diagram illustrating a configuration example of commands which the imaging apparatus according to an embodiment of the present invention receives.

FIG. 3D is a diagram illustrating a configuration example of commands which the imaging apparatus according to an embodiment of the present invention receives.

FIG. 6 is a block diagram illustrating a detailed configuration of the imaging apparatus according to an embodiment of the present invention.

FIG. 7A is a diagram illustrating a detailed configuration example of commands which the imaging apparatus according to an embodiment of the present invention receives.

FIG. 7B is a diagram illustrating a detailed configuration example of commands which the imaging apparatus according to an embodiment of the present invention receives.

FIG. 7C is a diagram illustrating a detailed configuration example of commands which the imaging apparatus according to an embodiment of the present invention receives.

FIG. 7D is a diagram illustrating a detailed configuration example of commands which the imaging apparatus according to an embodiment of the present invention receives.

FIG. 7E is a diagram illustrating a detailed configuration example of commands which the imaging apparatus according to an embodiment of the present invention receives.

FIG. 8A is a diagram illustrating a detailed configuration example of commands which the imaging apparatus according to an embodiment of the present invention receives.

FIG. 8B is a diagram illustrating a detailed configuration example of commands which the imaging apparatus according to an embodiment of the present invention receives.

FIG. 8C is a diagram illustrating a detailed configuration example of commands which the imaging apparatus according to an embodiment of the present invention receives.

FIG. 8D is a diagram illustrating a detailed configuration example of commands which the imaging apparatus according to an embodiment of the present invention receives.

FIG. 8E is a diagram illustrating a detailed configuration example of commands which the imaging apparatus according to an embodiment of the present invention receives.

FIG. 8F is a diagram illustrating a detailed configuration example of commands which the imaging apparatus according to an embodiment of the present invention receives.

FIG. 8G is a diagram illustrating a detailed configuration example of commands which the imaging apparatus according to an embodiment of the present invention receives.

FIG. 10A is a diagram illustrating a detailed configuration example of commands which the imaging apparatus receives, and a detailed configuration example of responses which the imaging apparatus transmits, according to an embodiment of the present invention.

FIG. 10B is a diagram illustrating a detailed configuration example of commands which the imaging apparatus receives, and a detailed configuration example of responses which the imaging apparatus transmits, according to an embodiment of the present invention.

FIG. 10C is a diagram illustrating a detailed configuration example of commands which the imaging apparatus receives, and a detailed configuration example of responses which the imaging apparatus transmits, according to an embodiment of the present invention.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Hereinafter, an embodiment of a case where the present invention is applied to an imaging apparatus such as a network camera will be described with reference to the attached drawings.

Figure 1:
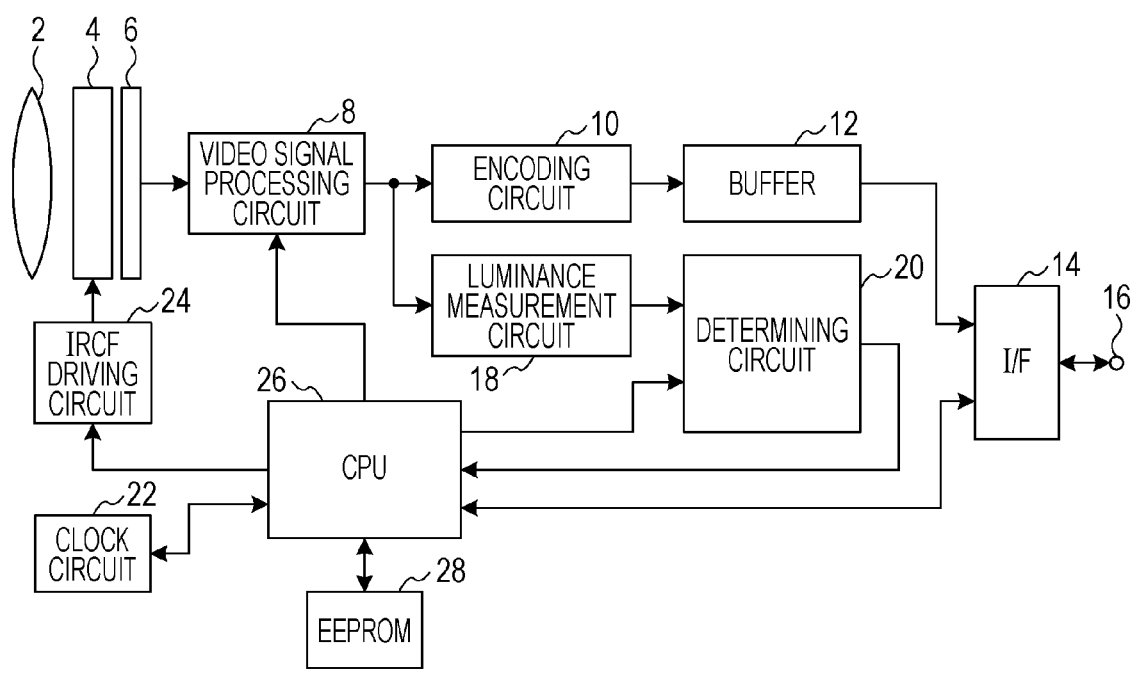
FIG. 1 is a block diagram illustrating the configuration of an imaging apparatus according to an embodiment of the present invention.

FIG. 1 is a block diagram illustrating the configuration of an imaging apparatus according to the present embodiment. In FIG. 1, reference numeral 2 denotes an imaging optical system, 4 denotes an infrared (IR) cut filter (hereinafter also abbreviated to IRCF), 6 an imaging device, 8 a video signal processing circuit, 10 an encoding circuit, and 12 a buffer.

Also, in FIG. 1, reference numeral 14 denotes a communication circuit (hereinafter also abbreviated to I/F), 16 a communication terminal, 18 a luminance measurement circuit, 20 a determining circuit, 22 a clock circuit, and 24 an infrared cut filter driving circuit (hereinafter also referred to as IRCF driving circuit). Further, in FIG. 1, reference numeral 26 denotes a central processing unit (hereinafter also abbreviated to CPU), and 28 in FIG. 1 denotes electrically erasable nonvolatile memory (Electrically Erasable Programmable Read Only Memory, hereinafter also abbreviated to EEPROM).

The operations will be described with reference to FIG. 1. Light rays from the subject being imaged are input to the imaging device 6 via the imaging optical system 2 and IRCF 4, and subjected to photoelectric conversion. The IRCF 4 is inserted and retracted to and from the optical path between the imaging optical system 2 and imaging device 6 by a driving mechanism not illustrated in the drawings, based on driving signals from the IRCF driving circuit 24. With the present embodiment, in the event that the IRCF 4 is inserted to the optical path, normal shooting (visible light shooting) is performed, and in the event that the IRCF 4 is retracted from the optical path, infrared shooting is performed.

Note that the imaging device 6 according to the present embodiment is configured of a CCD or CMOS or the like. Also, the imaging device 6 according to the present embodiment is equivalent to an imaging unit which outputs the image of the subject formed by the imaging optical system 2, as video signals.

Normal shooting (visible light shooting) as used in the present specification means shooting by inputting light from the subject to the imaging device 6 via the IRCF 4. Also, infrared shooting as used in the present specification means shooting by inputting light from the subject to the imaging device 6 without passing through the IRCF 4. Accordingly, with the present embodiment, a state in which normal shooting is performed is equivalent to a first imaging mode, and a state in which infrared shooting is performed is equivalent to a second imaging mode.

With the present embodiment, in the event that infrared shooting is to be performed, only luminance signals are output from the video signal processing circuit 8 to the encoding circuit 10 under instructions from the CPU 26. Encoded luminance signals are output to the buffer 12 packetized at the I/F 14, and externally transmitted via the communication terminal 16. On the other hand, in the event that normal shooting is to be performed, luminance signals and chrominance signals are output from the video signal processing circuit 8 to the encoding circuit 10 under instructions from the CPU 26. Encoded video signals are externally transmitted via the buffer 12, I/F 14, and communication terminal 16, in the same way.

Note that the communication terminal 16 according to the present embodiment is configured of a terminal to which a LAN cable is connected (LAN terminal), for example.

The I/F 14 receives transmission of settings commands relating to insertion and retraction of the IRCF 4 from an external client omitted from illustration.

In the event that an external client omitted from illustration transmits an insertion instruction command of the IRCF 4 to the optical path, this command is subjected to suitable packet processing at the I/F 14, and is input to the CPU 26. This insertion instruction command is decoded at the CPU 26. The CPU 26 inserts the IRCF 4 into the optical path by way of the IRCF driving circuit 24.

Note that this insertion instruction command is, for example, a SetImagingSettings command where the value of an IrCutFilter field has been set to On.

In the event that an external client omitted from illustration transmits an IRCF retraction instruction command from the optical path, this command is similarly subjected to suitable packet processing at the I/F 14, and is input to the CPU 26. This insertion instruction command is decoded at the CPU 26. The CPU 26 retracts the IRCF 4 from the optical path by way of the IRCF driving circuit 24. Note that this retraction instruction command is, for example, a SetImagingSettings command where the value of an IrCutFilter field has been set to Off.

With the present embodiment, the external client omitted from illustration can transmit a command for performing settings such that the imaging apparatus according to the present embodiment can decide retraction of the IRCF 4 from the optical path. This command is called, for example, a command for Auto settings.

Note that this command for Auto settings (Auto settings command) is the SetImagingSettings command of which the value of the later-described IrCutFilter field, for example, has been set to Auto.

With the present embodiment, a configuration is made such that an omissible operation parameter relating to insertion and retraction of the IRCF 4 can be added to an option field in this Auto settings command.

This omissible parameter is a luminance threshold value for deciding whether the imaging apparatus according to the present embodiment will insert or retract the IRCF to or from the optical path, based on change in the luminance of the subject, for example.

Note that the option field within the Auto settings command is a later-described IrCutFilterAutoAdjustment field, for example. Also, the parameter of this luminance threshold value is, for example, the value of a later-described BrightnessOffset field.

In the event that this parameter exists within the option field in the Auto settings command described above, the CPU 26 illustrated in FIG. 1 sets this threshold value to the determining circuit 20. The luminance measurement circuit 18 measures the current luminance of the subject based on the luminance signals output from the video signal processing circuit 8, and outputs to the determining circuit 20. Accordingly, the luminance measurement circuit 18 according to the present embodiment is equivalent to a photometer performing photometry of the subject luminance.

Note that the CPU 26 according to the present embodiment MAY calculate the threshold value by adding the luminance threshold value parameter to the value of the threshold value information stored in the EEPROM 28 beforehand, and setting the calculated threshold value to the determining circuit 20.

Also, the EEPROM 28 according to the present embodiment may be configured to store information of multiple threshold values, and luminance threshold value parameters correlated with each information of multiple threshold values, for example. Further, the CPU 26 according to the present embodiment may be configured to read out threshold value information corresponding to a luminance threshold value parameter from the EEPROM 28, and set the threshold value indicated by the threshold value information that has been read out to the determining circuit 20, for example.

The determining circuit 20 compares the luminance threshold value set as described above with the current luminance value output from the luminance measurement circuit 18, and outputs the measurement result to the CPU 26. In the event that the output determination result is one to the effect that the current luminance value exceeds the threshold value, the CPU 26 inserts the IRCF 4 into the optical path, so as to perform normal shooting. Also, in the event that the output determination result input to the CPU 26 is one to the effect that the current luminance value is at or below the threshold value, the CPU 26 retracts the IRCF 4 from the optical path, so as to perform infrared shooting.

In the event that the above-described omissible subject luminance threshold value parameter does not exist in the option field in the Auto settings command described above, the imaging apparatus according to the present embodiment determines the threshold value based on the threshold value information stored therein beforehand. With the present embodiment, this threshold value is stored in the EEPROM 28 beforehand for example, and the CPU 26 is arranged to read this threshold value output from the EEPROM 28 and set it to the determining circuit 20.

Accordingly, the CPU 26 according to the present embodiment functions as a luminance threshold value parameter determining unit for determining whether or not a luminance threshold value parameter exists in the option field in the Auto settings command. More specifically, the CPU 26 functions as an Adjustment field determining unit for determining whether or not a later-described IrCutFilterAutoAdjustment field is included in the SetImagingSettings command.

Note that with the present embodiment, data such as threshold value information stored in the EEPROM 28 beforehand is equivalent to control information, also, with the present embodiment, the threshold value information stored in the EEPROM 28 beforehand is equivalent to predetermined threshold value information.

Also, another omissible parameter in the Auto settings command described above may be delay time for delaying the insertion/retraction operations of the IRCF 4. In the event that this parameter exists in the option field in the Auto settings command described above, the CPU 26 sets this delay time parameter to the clock circuit 22. Note that this delay time parameter is a later-described ResponseTime field, for example.

The clock circuit 22 measures time, and when a set delay time elapses, outputs a signal indicating time elapsing to the CPU 26. The CPU 26 which has received input of the time elapsing signal performs insertion or retraction of the IRCF 4 by way of the IRCF driving circuit 24.

In the event that this delay time parameter does not exist in the option field of the above-described Auto settings command, the imaging apparatus according to the present embodiment determines the threshold value based on delay time information stored beforehand. With the present embodiment, this delay time is stored in the EEPROM 28 beforehand for example, and the CPU 26 is arranged to read out this delay time from the EEPROM 28 and set it to the determining circuit 20. Note that an arrangement may be made such that, in the event that this delay time parameter does not exist in the option field within the above-described Auto settings command, insertion or retraction of the IRCF 4 may be performed immediately, with no delay time set.

Accordingly, the CPU 26 according to the present embodiment functions as a delay time parameter determining unit for determining whether or not a delay time parameter exists in the option field in the Auto settings command. More specifically, the CPU 26 functions as a ResponseTime field determining unit to determine whether or not a ResponseTime field is included in the IrCutFilterAutoAdjustment field to be described later.

With the present embodiment, a command for insertion and retraction of the IRCF 4 to the optical path as described above is stipulated based on the Open Network Video Interface Forum (hereinafter also abbreviated to ONVIF) standard. With the ONVIF standard, the above commands are defined using, for example, the XML Schema Definition language (hereinafter also abbreviated to XSD).

Note that the imaging apparatus according to the present embodiment operates as a Network Video Transmitter (hereinafter also abbreviated to NVT) according to the above ONVIF standard. That is to say, the imaging apparatus according to the present embodiment can exchange data following ONVIF specifications.

FIG. 2A through FIG. 2E illustrate examples of data structure definitions, to define the above commands according to XSD. In FIG. 2A, data having a name of IrCutFilterModes is defined within data type ImagingSettings20. The data having the name IrCutFilterModes is data having an IrCutFilterMode type, and this data type is defined in FIG. 2B.

As illustrated in FIG. 2B, with the present embodiment, the IrCutFilterMode type is a data type which can assume any value of ON, OFF, or AUTO.

Also, FIG. 2C defines data having the name IrCutFilterAutoAdjustment of an IrCutFilterAutoAdjustment type. With the present embodiment, this IrCutFilterAutoAdjustment data is set to the option field when the IrCutFilterMode type described above has the value AUTO. This data is defined in the data type ImagingSettings20 described above, for example.

FIG. 2D is a diagram illustrating the contents of the above-described IrCutFilterAutoAdjustment type. This data type is defined as a complex type by an XSD complexType declaration. Also, this data type example has specified that the elements thereof appear in specified order, by a sequence specifier.

With the IrCutFilterAutoAdjustment type, BoundaryType which is the first element is data having the later-described IrCutFilterAutoBoundaryType type. One of this data BoundaryType must appear within the IrCutFilterAutoAdjustment type.

The next element is BrightnessOffset, indicating that this data is a float single-precision floating-point data type defined in Primitive Datatype in XSD. This BrightnessOffset is the luminance threshold value parameter described earlier. This data BrightnessOffset is arranged to be omissible by a minOccurs specifier in XSD.

The third element is ResponseTime, and is a duration time interval data type defined in Primitive Datatype in XSD. This data ResponseTime also is arranged to be omissible by a minOccurs specifier in XSD. The above-described delay time parameter is specified by this data ResponseTime.

FIG. 2E is a diagram illustrating a definition example of the above-described IrCutFilterAutoBoundaryType type. This data type is specified as a simple type by an XSD simpleType declaration. Also, this data type is defined as a character string type where the value is restricted by a restriction specifier. The IrCutFilterAutoBoundaryType type is a character string type where the value can assume the values of Common, Off, On, and Extended, as illustrated in FIG. 2E.

As described above with the present embodiment, an arrangement is made where an option parameter can be added to an Auto settings command to control insertion and retraction of the IRCF 4. This option may be such as the following, for example.

Option 1. A luminance threshold value for retracting the IRCF 4 in the event that the subject luminance changes from high luminance to low luminance.

Option 2. Delay time from the subject luminance falling below the luminance threshold value according to Option 1 until actually completing the operation of retracting the IRCF 4, when the subject luminance changes from high luminance to low luminance.

Option 3. A luminance threshold value for inserting the IRCF 4 in the event that the subject luminance changes from low luminance to high luminance.

Option 4. Delay time from the subject luminance exceeding the luminance threshold value according to Option 3 until actually completing the operation of inserting the IRCF 4, when the subject luminance changes from low luminance to high luminance.

With the present embodiment, the above Option 1 through Option 4 can be expressed with the above-described Auto settings command, by data definitions using the above-described XSD. With the ONVIF standard, the above-described Auto settings command is issued as an SetImagingSettings command, for example.

FIG. 3A through FIG. 3D illustrate configuration examples of the SetImagingSettings command FIG. 3A is a diagram illustrating the configuration of a SetImagingSettings command, including the above option field. In FIG. 3A, the value of the IrCutFilter field is AUTO, whereby automatic control of insertion and retraction of the IRCF by the imaging apparatus itself is instructed. With the present embodiment, in the event that the value of the IrCutFilter field is AUTO, the IrCutFilterAutoAdjustment field can be described thereafter. As described above, this IrCutFilterAutoAdjustment field is omissible.

As described above, described in the IrCutFilterAutoAdjustment field are the BoundaryType field, BrightnessOffset field, and ResponseTime field. Also, as described above, the BrightnessOffset field and ResponseTime field are omissible.

In either case of inserting of retracting the IRCF by the above-described BoundaryType field, whether or not to make the operation specified in this IrCutFilterAutoAdjustment field valid can be specified. In the event that the value of the BoundaryType field is On, this becomes valid when the IRCF is inserted, and in the event that the value of the BoundaryType field is Off, this becomes valid when the IRCF is retracted. Also, in the event that the value of the BoundaryType field is Common, this becomes valid in both cases of insertion and retraction. Also, as described above, the luminance threshold value is set by the value of the BrightnessOffset field described above, and the delay time is set by the value of the ResponseTime field described above.

FIG. 3B illustrates the configuration of the SetImagingSettings command described above in a case where the ResponseTime field described above has been omitted. In the event that the ResponseTime field has been omitted in this way, with the imaging apparatus according to the present embodiment, the imaging apparatus itself determines the operation of the delay time parameter. With the present embodiment, this delay time is stored in the EEPROM 28 beforehand for example, and the CPU 26 reads this delay time out from the EEPROM 28 and sets it to the determining circuit 20. Also, with FIG. 3B, the value of the BoundaryType field is set to On, such that the operation specified in the IrCutFilterAutoAdjustment field becomes valid when the IRCF is inserted.

FIG. 3C illustrates the configuration of the SetImagingSettings command in a case of the BrightnessOffset field and ResponseTime field above having been omitted. In the event that the BrightnessOffset field has been omitted in this way, with the imaging apparatus according to the present embodiment, the imaging apparatus determines the luminance threshold value based on threshold value information stored in itself beforehand. As described above, with the present embodiment the luminance threshold value is stored in the EEPROM 28 beforehand for example, and the CPU 26 reads this threshold value out from the EEPROM 28 and sets it to the determining circuit 20.

FIG. 3D illustrates the configuration of the SetImagingSettings command described above in a case where the IrCutFilterAutoAdjustment field described above has been omitted. With the imaging apparatus according to the present embodiment, in the event of having received a SetImagingSettings command to automatically set the IRCF with the IrCutFilterAutoAdjustment field omitted, all IRCF insertion and retraction control is decided by the imaging apparatus itself.

Next, operations in a case of the luminance threshold value and delay time parameters having been set with the present embodiment will be described with reference to FIG. 4.

Figure 4:
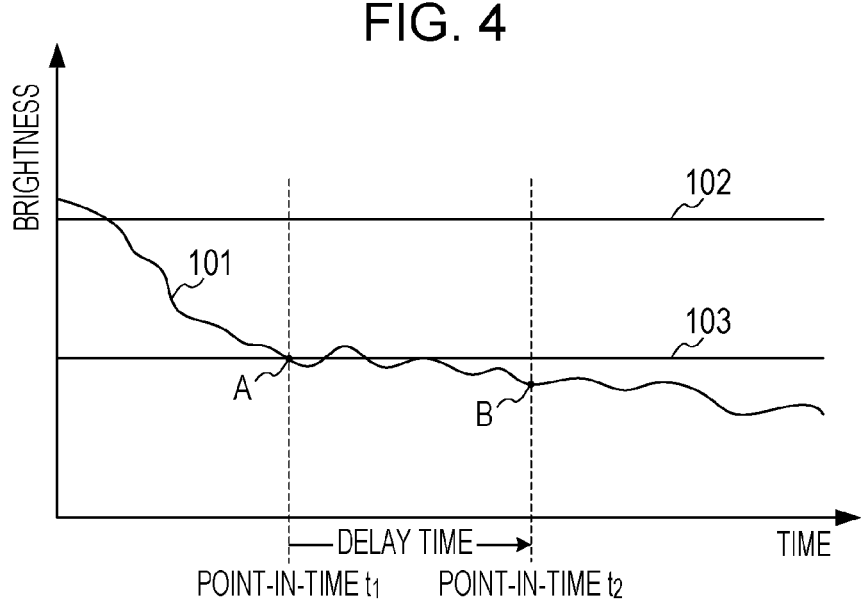
FIG. 4 is a diagram for describing operations of the imaging apparatus according to an embodiment of the present invention, in a case where luminance value and delay time parameters are set.

In FIG. 4, reference numeral 101 denotes a graph representing temporal change of subject luminance, 102 denotes a luminance threshold value for insertion of the IRCF 4, and 103 denotes a luminance threshold value for retraction of the IRCF 4. FIG. 4 illustrates a case of subject luminance decreasing over time, such as around dusk. AS illustrated in FIG. 4, upon the subject luminance decreasing to below the luminance threshold value 103 for retracting the IRCF 4, the CPU 26 sets the delay time to the clock circuit 22 and starts the clocking operation.

In FIG. 4, the subject luminance has dropped below the luminance threshold value 103 at point A. The point-in-time here is $t_1$ (t.sub.1). With the present embodiment, the CPU 26 does not retract the IRCF 4 until the delay time set to the clock circuit 22 has elapsed. That is to say, in the event that the delay time set to the clock circuit 22 is not longer than a time over which a state is maintained with the subject luminance below the luminance threshold value 103, the CPU 26 does not retract the IRCF 4 from the optical path of the imaging optical system 2.

Due to this operation, even if the subject luminance frequently intersects the luminance threshold value 103, there is no frequent switching between normal shooting and infrared shooting.

Subsequently, upon this delay time elapsing and reaching point-in-time $t_2$ (t.sub.2), the CPU 26 retracts the IRCF 4 and transitions to infrared shooting. That is to say, in the event that the delay time set to the clock circuit 22 is longer than a time over which a state is maintained with the subject luminance below the luminance threshold value 103, the CPU 26 retracts the IRCF 4 from the optical path of the imaging optical system 2.

This increases the probability that the subject luminance threshold value at this time will stay below the luminance threshold value 103 in a stable manner, such as with point B. This operation also acts in the same manner when there is influence of fluorescent lights or the like flickering.

With the present embodiment, the configuration is such that the user can perform detailed settings relating to insertion and retraction of the IRCF, due to this operation. Also, due to this operation, with the present embodiment, frequent insertion and retraction of the IRCF can be prevented even if the luminance level of the imaging subject is close to the threshold value. Also, due to this operation, with the present embodiment, frequent insertion and retraction of the IRCF can be prevented even with cases where the luminance level of the imaging subject changes due to flickering of lights and so forth.

Note that in the event that the delay time set to the clock circuit 22 is not longer than a time over which a state is maintained with the subject luminance above the luminance threshold value 102, the CPU 26 does not insert the IRCF 4 to the optical path of the imaging optical system 2. On the other hand, in the event that the delay time set to the clock circuit 22 is longer than a time over which a state is maintained with the subject luminance above the luminance threshold value 102, the CPU 26 inserts the IRCF 4 to the optical path of the imaging optical system 2.

Figure 5:
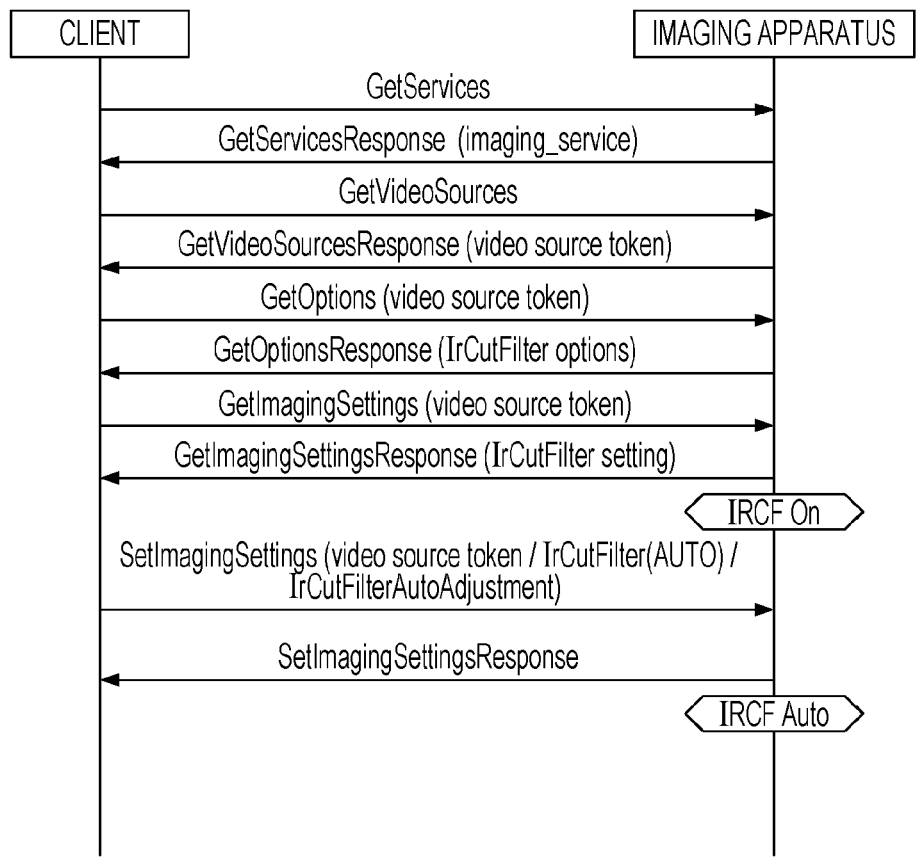
FIG. 5 is a diagram for describing command and response exchanging operations between an imaging apparatus and client according to an embodiment of the present invention.

Next a typical operation of exchanging commands and responses (command transactions) with the present embodiment will be described with reference to FIG. 5. FIG. 5 describes the command transaction using a so-called message sequence chart defined in the ITU-T Recommendation Z.120 standard.

First, an unshown client and the imaging apparatus according to the present embodiment are connected via network. The client performs the following operations in order to check whether or not there is a command for setting the IRCF (SetImagingSettings command) described above. First, a GetServices command is transmitted to the imaging apparatus to check whether or not there is an Imaging Service.

In FIG. 5, a GetServiceResponse indicates that the imaging apparatus supports Imaging Service. Next, the client transmits a GetVideoSource command to check a token indicating Video Source which can perform IRCF settings.

In FIG. 5, the imaging apparatus according to the present embodiment has returned the token with a GetVideoSourceResponse.

Note that the token indicating the Video Source is information which can uniquely identify Video Source, and is information represented in alphanumeric characters.

Next, the client transmits a GetOptions command including the token indicating the Video Source, to the address indicating the Imaging Service of the imaging apparatus. This is to check whether or not there is a command to perform settings of IRCF described above, and options relating to commands for performing IRCF settings.

The imaging apparatus according to the present embodiment returns a GetOptionsResponse including the IrCutFilter field and the options thereof to the client, as illustrated in FIG. 5. Next, the client transmits a GetImagingSettings command including the token indicating the Video Source described above, to the address indicating the Imaging Service of the imaging apparatus, to query the current IRCF state.

The imaging apparatus according to the present embodiment returns a GetImagingSettingsResponse including the current IRCF state in the IrCutFilter field, in response to the GetImagingSettings command, as illustrated in FIG. 5. The client detects the current state of the imaging apparatus by this response. With the present embodiment as illustrated in FIG. 5, the IRCF is inserted in the optical path.

Next, in order to set the IRCF settings to automatic control, the client transmits a SetImagingSettings command including a token indicating the Video Source described above, to an address indicating the Imaging Service of the imaging apparatus. With the example illustrated in FIG. 5, the client transmits a SetImagingSettings command with the value of the IrCutFilter field set to AUTO, and also the IrCutFilterAutoAdjustment field set.

In FIG. 5, the imaging apparatus according to the present embodiment returns a SetImagingSettingsResponse with arguments omitted to the client, to indicate that the SetImagingSettings command has been successfully executed.

With the IrCutFilterAutoAdjustment field in the SetImagingSettings command, the luminance threshold value can be set in the BrightnessOffset field, and the delay time can be set in the ResponseTime field. Also, the BrightnessOffset field and ResponseTime field are omissible. Also, with the SetImagingSettings command according to the present embodiment, the IrCutFilterAutoAdjustment field itself is omissible.

In FIG. 5, due to the SetImagingSettings command having been executed successfully, Auto settings are implemented in which the imaging apparatus itself decides insertion and retraction control of the IRCF.

As described above, the present embodiment has a configuration regarding the SetImagingSettings command that the IrCutFilterAutoAdjustment field is omissible. That is to say, the user can set IRCF control to Auto without considering luminance threshold value and delay time, which is advantageous in improving user operability.

Note that the imaging apparatus according to the present embodiment permits IRCF settings regardless of the current IRCF state. Accordingly, in FIG. 5, the transaction of the GetImagingSettings command and GetImagingSettingsResponse can be omitted.

Also, with the present embodiment, a SetImagingSettings command with the value corresponding to the IrCutFilter field (IrCutFilter tag) set to ON corresponds to a first command. Also, a SetImagingSettings command with the value corresponding to the IrCutFilter tag set to OFF corresponds to a second command. Further, a SetImagingSettings command with the value corresponding to the IrCutFilter tag set to AUTO corresponds to a third command.

Also, with the present embodiment, the value corresponding to the IrCutFilterAutoAdjustment field (IrCutFilterAutoAdjustment tag) included in the SetImagingSettings command corresponds to the added information. The value corresponding to the ResponseTime field (ResponseTime tag) included in the IrCutFilterAutoAdjustment tag corresponds to the response time information.

Note that while BrightnessOffset has been used with the present embodiment, but is not restricted to this. Data having the name BoundaryOffset may be used instead of BrightnessOffset, for example.

This BoundaryOffset is data of IrCutFilterAutoBoundaryOffset type. The value of this IrCutFilterAutoBoundaryOffset type is a float single-precision floating-point data type value. Further, the value of this IrCutFilterAutoBoundaryOffset type is restricted to between −1.0 and 1.0.

Further, the value of the BoundaryOffset field has an initial value (default) of 0. The value of the BoundaryOffset field indicates that the closer the value is to −1.0, the more correction is made so that the luminance threshold value is lower (smaller). On the other hand, the closer the value of BoundaryOffset is to 1.0, the more correction is made so that the luminance threshold value is higher (greater).

Accordingly, this prevents a value of a range which the imaging apparatus according to the present embodiment cannot handle (i.e., a value too great or a value too small) from being set as the BoundaryOffset field by an unshown external client.

Also, with the present embodiment, data having a name of IrCutFilterAutoAdjustmentOptions may further be defined within the data type ImagingOptions20 by XSD, for example. Data having this name IrCutFilterAutoAdjustmentOptions is data of IrCutFilterAutoAdjustmentOptions type.

Now, the IrCutFilterAutoAdjustmentOptions type is defined as a complex type by an XSD complexType declaration. Also, the IrCutFilterAutoAdjustmentOptions type has specified that the elements thereof appear (described) in specified order, by a sequence specifier.

For example, the first element of the IrCutFilterAutoAdjustmentOptions type is data having the name of BoundaryType of the IrCutFilterAutoBoundaryType type. Also, the second element of the IrCutFilterAutoAdjustmentOptions type is data having the name of BoundaryOffset field of a float single-precision floating-point data type. The range of values of this data is restricted.

Further, the third element of the IrCutFilterAutoAdjustmentOptions type is data having the name of ResponseTime of the duration time interval data type defined as an XSD Primitive Datatype.

The second element and third element in the IrCutFilterAutoAdjustmentOptions type can be omitted by specifying with an XSD minOccurs specifier.

Further, in the event of receiving a GetOptions command including a token indicating the Video Source from an unshown external client, the imaging apparatus according to the present embodiment may be configured to perform the following operations. This is an operation of returning (transmitting) a GetOptionsResponse including data having the name of IrCutFilterAutoAdjustmentOptions to the unshown external client.

Also, in the event of receiving a GetImagingSettings command including a token indicating the Video Source from an unshown external client, the imaging apparatus according to the present embodiment may be configured to perform the following operations. This is an operation of returning (transmitting) a GetImagingSettingsResponse including data having the name of IrCutFilterAutoAdjustmentOptions to the unshown external client.

Accordingly, of the IrCutFilterAutoAdjustment type data, data to which the imaging apparatus according to the present embodiment can handle can be notified to the unshown external client.

Also, with the present embodiment, the CPU 26 is configured so as to perform the following operations in the event that the I/F 14 has input to the CPU 26 a SetImagingSettings command in which the value of IrCutFilter field is set to On. This is an operation where the CPU 26 controls the IRCF driving circuit 24 so as to places the IRCF 4 in the optical path of the imaging optical system 2. However, this configuration is not restrictive.

For example, the CPU 26 may be configured so as to perform the following operations in the event that the I/F 14 has input to the CPU 26 a SetImagingSettings command in which the value of IrCutFilter field is set to On.

That is to say, the CPU 26 may be configured to instruct the video signal processing circuit 8 to lower the gain of the video signal output from the imaging device 6 so as to be lower than the later-described digital night mode. More specifically, the CPU 26 may be configured to instruct the video signal processing circuit 8 to lower the gain of each color of the video signals output from the imaging device 6 so as to be lower than the later-described digital night mode.

Now, a state where the gain of each color of the video signals output from the imaging device 6 is lower than the later-described digital night mode is a state where the video signals are being corrected using gain calculated based on a value corresponding to each color of the video signals (called day mode). Also, the video signal processing circuit 8 according to the present embodiment functions as a white balance adjusting unit for performing adjustment of the white balance of the video signals output from the imaging device 6.

Further, with the present embodiment, the CPU 26 is configured such that, in the event that a SetImagingSettings command with the value of the IrCutFilter field set to Off is input from the I/F 14 to the CPU 26, the following operation is performed. This operation is for the CPU 26 to control the IRCF driving circuit 24 so as to place the IRCF 4 outside of the optical path of the imaging optical system 2. However, this configuration is not restrictive.

For example, the CPU 26 may be configured such that, in the event that a SetImagingSettings command with the value of the IrCutFilter field set to Off is input from the I/F 14 to the CPU 26, the following operation is performed.

That is, the CPU 26 may be configured so as to instruct the video signal processing circuit 8 to amplify gain as to the video signals output from the imaging device 6 so as to be higher than day mode. More specifically, the CPU 26 may be configured to instruct the video signal processing circuit 8 to amplify the gain of each color of the video signals output from the imaging device 6 so as to be higher than day mode.

Note that with the present specification, a state where the gain of each color of the video signals output from the imaging device 6 is amplified more than the day mode is called digital night mode.

If the CPU 26 is configured in this way, the CPU 26 functions as a selecting unit which selects day mode or digital night mode.

A configuration may be made where the imaging apparatus according to the present embodiment has added thereto a motive power source such as a stepping motor or the like, so that the imaging optical system 2 can be turned in the panning direction or tilting direction by the added motive power source. Further, the imaging apparatus according to the present embodiment may have added thereto a dome cover formed in a half-sphere form. This dome cover has transparency, and so formed as a half-sphere form.

Also, there may be cases where the imaging apparatus according to the present embodiment receives a SetImagingSettings command including an IrCutFilterAutoAdjustment field in which the order of the BoundaryType field and so forth is not described as defined. For example, there may be cases where the imaging apparatus according to the present embodiment receives a SetImagingSettings command including an IrCutFilterAutoAdjustment field in which the BoundaryOffset field is described first.

In such a case, the imaging apparatus according to the present embodiment may be configured so as to transmit a SetImagingSettingsResponse including information indicating an error, to the unshown external client.

Next, the embodiment described above will be described in detail with reference to FIGS. 6 through 11. Note that in the following description, components which are the same as those in the above-described embodiment will be denoted with the same reference numerals, and description thereof will be omitted.

Also, in the present specification, the value of a field means a value corresponding to the tag. For example, the value of the IrCutFilterAutoAdjustment field means a value corresponding to the <IrCutFilterAutoAdjustment> tag.

Also, for example, the value of the BoundaryType field means a value corresponding to the <BoundaryType> tag. Further, for example, the value of the BoundaryOffset field means a value corresponding to the <BoundaryOffset> tag. Moreover, for example, the value of the ResponseTime field means a value corresponding to the <ResponseTime> tag.

Next, we will say that the imaging apparatus according to the present embodiment is a surveillance camera of shooting moving images, and more specifically, is a network camera used for surveillance. We will say that the imaging apparatus according to the present embodiment is to be installed on a wall or ceiling. We will further say that the imaging apparatus according to the present embodiment is capable of handling power over Ethernet (PoE), with power supplied thereto via a LAN cable.

Moreover, with the present embodiment, the imaging apparatus and external client device make up an imaging system.

FIG. 6 is a block diagram illustrating the detailed configuration of the imaging apparatus according to the present embodiment. In FIG. 6, a gain setting circuit 7 sets gain as to video signals output from the imaging device 6, under instructions from the CPU 26.

For example, the CPU 26 instructs the IRCF driving circuit 24 so as to insert the IRCF 4 into the optical path of the imaging optical system 2, and instructs the gain setting circuit 7 to set the gain as to the video signals output from the imaging device 6 to a first gain.

Also, the CPU 26 instructs the IRCF driving circuit 24 so as to retract the IRCF 4 from the optical path of the imaging optical system 2, and instructs the gain setting circuit 7 to set the gain as to the video signals output from the imaging device 6 to a second gain. Note that the second gain is greater than the first gain.

Next, the video signal processing circuit 8 in FIG. 6 changes the dynamic range of the video signals output from the imaging device 6, following the instructions of the CPU 26. For example, the CPU 26 gives an instruction to the video signal processing circuit 8, instructs the IRCF driving circuit 24 so as to insert the IRCF 4 into the optical path of the imaging optical system 2, and changes the dynamic range of the video signals output from the imaging device 6 to a first dynamic range.

Also, the CPU 26 gives an instruction to the video signal processing circuit 8, instructs the IRCF driving circuit 24 so as to retract the IRCF 4 from the optical path of the imaging optical system 2, and changes the dynamic range of the video signals output from the imaging device 6 to a second dynamic range. Note that the second dynamic range is wider than the first dynamic range.

An imaging device driving circuit 23 in FIG. 6 drives the imaging device 6 following instructions of the CPU 26. For example, the CPU 26 instructs the IRCF driving circuit 24 so as to insert the IRCF 4 into the optical path of the imaging optical system 2, and instructs the imaging device driving circuit 23 to set the charge accumulation time of the imaging device 6 to a first charge accumulation time.

Also, the CPU 26 instructs the IRCF driving circuit 24 so as to retract the IRCF 4 from the optical path of the imaging optical system 2, and instructs the imaging device driving circuit 23 to set the charge accumulation time of the imaging device 6 to a second charge accumulation time. Note that the second charge accumulation time is longer than the first charge accumulation time.

Moreover, the CPU 26 in FIG. 6 has image processing functions. For example, the CPU 26 instructs the IRCF driving circuit 24 so as to insert the IRCF 4 into the optical path of the imaging optical system 2, and performs image processing such that the video signals output from the imaging device 6 are at a first brightness level.

Also, the CPU 26 instructs the IRCF driving circuit 24 so as to retract the IRCF 4 from the optical path of the imaging optical system 2, and performs image processing such that the video signals output from the imaging device 6 are at a second brightness level. Note that the second brightness is brighter than the first brightness.

Further, in the event that infrared shooting is performed, the color balance of the video signals output from the imaging device 6 will not hold, so the CPU 26 according to the present embodiment converts the video signals output from the imaging device 6 into monochrome video signals, and then transmits from the I/F 14. We will call the imaging mode of the imaging apparatus according to the present embodiment at this time a monochrome mode.

Also, in the event that normal shooting is performed, the CPU 26 according to the present embodiment gives priority to color reproducibility of the video signals output from the imaging device 6, so the video signals output from the imaging device 6 are transmitted from the I/F 14 as color video signals. We will call the imaging mode of the imaging apparatus according to the present embodiment at this time a color mode.

Next, definition examples of data structures to define commands in XSD will be described in detail with reference to FIGS. 7A through 7E. FIG. 7A is the same as FIG. 2A, so description thereof will be omitted. FIG. 7B is the same as FIG. 2B, so description thereof will be omitted. FIG. 7C is the same as FIG. 2C, so description thereof will be omitted.

FIG. 7D is a diagram illustrating the contents of the IrCutFilterAutoAdjustment type. This data type is defined as a complex type by an XSD complexType declaration. Also, this data type example has specified that the elements thereof appear in specified order, by a sequence specifier.

With the IrCutFilterAutoAdjustment type, BoundaryType which is the first element is the same as BoundaryType in FIG. 2D, so description thereof will be omitted. Note that this BoundaryType is data having the later-described IrCutFilterAutoBoundaryType type.

The next element is BoundaryOffset, indicating that this data is a float single-precision floating-point data type defined in Primitive Datatype in XSD. This BoundaryOffset is the luminance threshold value parameter described earlier. This data BoundaryOffset is arranged to be omissible by a minOccurs specifier in XSD.

Note that the value corresponding to the <BoundaryOffset> tag with the present embodiment corresponds to the brightness information relating to the brightness of the subject imaged by the imaging apparatus according to the present embodiment. Also, the range of values corresponding to the <BoundaryOffset> tag is restricted to a predetermined range. Specifically, the range of values corresponding to the <BoundaryOffset> tag is restricted to between −1.0 and 1.0.

The third element is the same as ResponseTime in FIG. 2D, so description thereof will be omitted. The value corresponding to the <ResponseTime> tag with the present embodiment corresponds to the response time information relating to the response time of insertion and retraction of the IRCF 4 by the IRCF driving circuit 24.

Accordingly, the value corresponding to the <BoundaryOffset> tag and the value corresponding to the <ResponseTime> tag according to the present embodiment correspond to automatic adjusting information for insertion and retraction of the IRCF 4.

FIG. 7E is a diagram illustrating a definition example of the above-described IrCutFilterAutoBoundaryType type. This data type is specified as a simple type by an XSD simpleType declaration. Also, this data type is defined as a character string type where the value is restricted by a restriction specifier.

The IrCutFilterAutoBoundaryType type is a character string type where the value can assume the values of Common, ToOn, ToOff, and Extended, as illustrated in FIG. 7E.

Note that Common in FIG. 7E is equivalent to Common in FIG. 2E. Also, ToOn in FIG. 7E is equivalent to On in FIG. 2E. Further, ToOff in FIG. 7E is equivalent to Off in FIG. 2E.

Next, FIGS. 8A through 8G illustrate in detail configuration examples of the SetImagingSettings command described above. FIG. 8A is a diagram illustrating the configuration of a SetImagingSettings command, including the option field described above. In FIG. 8A, the value of the IrCutFilter field is AUTO, indicating that the imaging apparatus itself automatically controls insertion and retraction of the IRCF.

Accordingly, with the present embodiment, a SetImagingSettings command of which the value of the IrCutFilter field is set to AUTO is equivalent to an automatic insertion/retraction control command. Note that an automatic insertion/retraction control command is a command to cause the imaging apparatus according to the present embodiment to automatically control insertion and retraction of the IRCF 4 by the IRCF driving circuit 24.

With the present embodiment, in the event that the value of the IrCutFilter field is AUTO, the IrCutFilterAutoAdjustment field can be described thereafter. As described above, this IrCutFilterAutoAdjustment field is omissible.

As described above, the BoundaryType field, BoundaryOffset field, and ResponseTime field are described in the IrCutFilterAutoAdjustment field.

That is to say, as illustrated in FIG. 8A, the <BoundaryType> tag, <BoundaryOffset> tag, and <ResponseTime> tag can be described in the SetImagingSettings command, in that order.

Further, as described above, the BoundaryOffset field and ResponseTime field are omissible.

Also described above is that the above-described BoundaryType field can specify which of inserting and retracting the IRCF validates the operation specified in this IrCutFilterAutoAdjustment field.

That is to say, in the event that the value of the BoundaryType field is ToOn, this is valid when the IRCF is inserted, and in the event that the value of the BoundaryType field is ToOff, this is valid when the IRCF is retracted.

Also, in the event that the value of the BoundaryType field is Common, this is valid when the IRCF is both inserted and retracted. Also, as described above, the luminance threshold value is set by the value of the above-described BoundaryOffset, and the delay time is set by the above-described ResponseTime field.

Accordingly, with the present embodiment, the <BoundaryType> tag correlated with ToOn as a value is equivalent to insertion specifiable information. This insertion specifiable information can specify that the CPU 26 perform the following determination, based on the value of the <BoundaryOffset> tag and value of the <ResponseTime> tag correlated with this <BoundaryType> tag. This determination is to determine whether or not to insert the IRCF 4 into the optical path of the imaging optical system 2.

Also, with the present embodiment, the <BoundaryType> tag correlated with ToOff as a value is equivalent to retraction specifiable information. This retraction specifiable information can specify that the CPU 26 perform the following determination, based on the value of the <BoundaryOffset> tag and value of the <ResponseTime> tag correlated with this <BoundaryType> tag. This determination is to determine whether or not to retract the IRCF 4 from the optical path of the imaging optical system 2.

Also, with the present embodiment, the <BoundaryType> tag correlated with Common as a value is equivalent to common specifiable information. This common specifiable information can specify that the CPU 26 uses the value of the <BoundaryOffset> tag and value of the <ResponseTime> tag correlated with this <BoundaryType> tag for the following two determinations in common. These determinations are to determine whether or not to insert the IRCF 4 into the optical path of the imaging optical system 2, and to determine whether or not to retract the IRCF 4 from the optical path of the imaging optical system 2.

FIG. 8B illustrates the configuration of the SetImagingSettings command described above, in a case where the ResponseTime field described above has been omitted. In the event that the ResponseTime field has thus been omitted, the imaging apparatus according to the present embodiment determines the operations of the delay time parameter itself.

With the present embodiment, the delay time is stored in the EEPROM 28 beforehand, for example, and the CPU 26 reads out this delay time from the EEPROM 28 and sets it to the determining circuit 20. Also, in FIG. 8B, ToOn is set to the BoundaryType field such that the operation specified in the IrCutFilterAutoAdjustment field will become valid when the IRCF is inserted.

FIG. 8C illustrates the configuration of the SetImagingSettings command in a case wherein the value of the BoundaryType field described above is Common. In this case, the value of the BoundaryOffset described above and the value of the ResponseTime described above become value both when the IRCF 4 is inserted and retracted.

Also, as described above, the luminance threshold value is set by the value of the above-described BoundaryOffset, and the delay time is set by the above-described ResponseTime field.

FIG. 8D illustrates the configuration of the SetImagingSettings command in a case where the IrCutFilterAutoAdjustment field has been omitted.

Now, the imaging apparatus according to the present embodiment is arranged such that the imaging apparatus itself decides all IRCF insertion and retraction control in a case of having received the following SetImagingSettings command. This SetImagingSettings command is one for automatic settings of the IRCF, where the IrCutFilterAutoAdjustment field has been omitted.

FIG. 8E illustrates the configuration of the SetImagingSettings command described above, where the value of the IrCutFilter field is ON. FIG. 8F illustrates the configuration of the SetImagingSettings command described above, where the value of the IrCutFilter field is OFF.

With the present embodiment, in a case such as with FIG. 8E or FIG. 8F, the configuration is such that the IrCutFilterAutoAdjustment field has not been set.

FIG. 8E illustrates the configuration of the SetImagingSettings command in a case where the value of the IrCutFilter field is ON. Also, FIG. 8F illustrates the configuration of the SetImagingSettings command in a case where the value of the IrCutFilter field is OFF.

FIG. 8G illustrates the configuration of the SetImagingSettings command in a case where the value of the IrCutFilter tag is AUTO.

This SetImagingSettings command includes a first IrCutFilterAutoAdjustment tag corresponding to the BoundaryType tag where ToOn has been set as a value. This SetImagingSettings command also includes a second IrCutFilterAutoAdjustment tag corresponding to the BoundaryType tag where ToOff has been set as a value.

Accordingly, the CPU 26 uses values corresponding to each of the BoundaryOffset tag and the ResponseTime tag corresponding to the first IrCutFilterAutoAdjustmentType tag for determination of whether or not to insert the IRCF 4.

Also, the CPU 26 uses values corresponding to each of the BoundaryOffset tag and the ResponseTime tag corresponding to the second IrCutFilterAutoAdjustmentType tag for determination of whether or not to retract the IRCF 4.

Also, the <BoundaryType> tag with which the value of ToOn has been correlated, and the <BoundaryType> tag with which the value of ToOff has been correlated, can each be described in the SetImagingSettings command, in that order. In other words, the SetImagingSettings command can describe the <BoundaryType> tag with which the value of ToOn has been correlated, and the <BoundaryType> tag with which the value of ToOff has been correlated, in that order.

Figure 9:
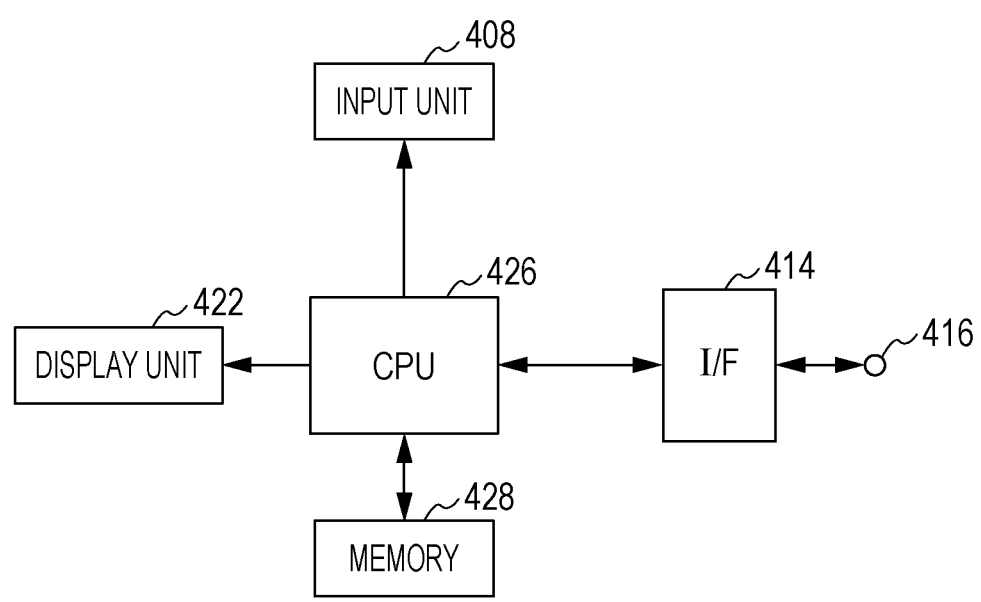
FIG. 9 is a diagram illustrating a block diagram illustrating a detailed configuration of a client device according to an embodiment of the present invention.

Next, the configuration of a client device according to the present embodiment will be described in detail with reference to FIG. 9. FIG. 9 is a block diagram illustrating the configuration of a client device according to an embodiment of the present invention. Note that the client device according to the present embodiment operates as a Network Video Receiver (hereinafter also abbreviated to NVR) according to the above-described ONVIF standard. That is to say, the client device according to the present embodiment can exchange data according to ONVIF specifications.

In FIG. 9, reference numeral 408 denotes an input unit, 414 a digital interface unit (hereinafter also called I/F), 416 an interface terminal, 422 a display unit, 426 a central processing unit (hereinafter also abbreviated to CPU), and 428 memory.

The client device illustrated in FIG. 9 is typically a general-purpose computer such as a personal computer (hereinafter also abbreviated to PC). The input unit 408 is, for example, a keyboard, a pointing device such as a mouse, or the like. Examples of the display unit 422 include a liquid crystal display device, plasma display device, cathode ray tube (hereinafter also abbreviated to CRT) display device, or the like.

For example, the CPU 426 instructs the I/F 414 to transmit a GetOptions command to the imaging apparatus according to the present embodiment. The CPU 426 also instructs the I/F 414 to acquire a GetOptionsResponse from the imaging apparatus according to the present embodiment.

Also, CPU 426 instructs the I/F 414 to transmit a SetImagingSettings command to the imaging apparatus according to the present embodiment. The value corresponding to the <BoundaryType> tag included in this SetImagingSettings command matches the value corresponding to a later-described <img20:Mode> tag included in the GetOptionsResponse.

Next, the GetOptions command and GetOptionsResponse in FIG. 5 will be described in detail with reference to FIGS. 10A through 10C. FIG. 10A illustrates a GetOptions command of which the value corresponding to the VideoSourceToken tag is 0.

FIG. 10B and FIG. 10C each illustrate an example of GetOptionsResponse. Now, we will assume an imaging apparatus capable of specifying IrCutFilterAutoAdjustment in common for each of a case of inserting the IRCF 4 to the optical path of the imaging optical system 2 and of retracting the IRCF 4 from the optical path of the imaging optical system 2. FIG. 10B illustrates a GetOptionsResponse which the imaging apparatus thus assumed transmits.

Also, we will assume an imaging apparatus capable of individually specifying IrCutFilterAutoAdjustment for each of a case of inserting the IRCF 4 to the optical path of the imaging optical system 2 and of retracting the IRCF 4 from the optical path of the imaging optical system 2. FIG. 10C illustrates a GetOptionsResponse which the imaging apparatus thus assumed transmits.

In FIG. 10B, three <img20:IrCutFilterModes> tags are correlated with the <ImagingOptions20> tag. These three <img20:IrCutFilterModes> tags are correlated with ON, OFF, and AUTO.

Accordingly, the imaging apparatus assumed in FIG. 10B can operate following the SetImagingSettings command in which ON, OFF, and AUTO have been set as values of the IrCutFilter field.

Also, in FIG. 10B, the following three tags are correlated with the <IrCutFilterAutoAdjustmentOptions> tag, these being the <img20:Mode> tag, <img20:BoundaryOffset> tag, and <img20:ResponseTime> tag.

Now, Common is correlated with the <img20:Mode> tag. Thus, the GetOptionsResponse illustrated in FIG. 10B indicates the following. That is to say, the information of the <IrCutFilterAutoAdjustment> tag used by the CPU 26 is specifiable in common regarding the case of inserting the IRCF 4 into the optical path of the imaging optical system 2 and the case of retracting the IRCF 4 from the optical path.

Also, true is correlated with the <img20:BoundaryOffset> tag. This means that the imaging apparatus assumed with FIG. 10B can operate following the SetImagingSettings command with the value set corresponding to the <BoundaryOffset> tag.

Further, the <img20:ResponseTime> tag is correlated with the <img20:Min> tag and <img20:Max> tag. Accordingly, the imaging apparatus assumed with FIG. 10B can operate following based on the SetImagingSettings command where a time of 0 seconds or more but within 30 minutes has been set as the value corresponding to <ResponseTime>.

In FIG. 10C, the same as with FIG. 10B, three <img20:IrCutFilterModes> tags are correlated with the <ImagingOptions20> tag. These three <img20:IrCutFilterModes> tags are correlated with ON, OFF, and AUTO.

Also in FIG. 10C, the following four tags are correlated with the <IrCutFilterAutoAdjustment> tag. These are two <img20:Mode> tags, the <img20:BoundaryOffset> tag, and the <img20:ResponseTime> tag.

The two <img20:Mode> tags are correlated with ToOn and ToOff. Accordingly, the GetOptionsResponse illustrated in FIG. 10C indicates the following. That is to say, the information of the <IrCutFilterAutoAdjustment> tag used by the CPU 26 is individually specifiable regarding the case of inserting the IRCF 4 into the optical path of the imaging optical system 2 and the case of retracting the IRCF 4 from the optical path.

Also, true is correlated with the <img20:Mode> tag. Further, the <img20:ResponseTime> tag is correlated with the <img20:Min> tag and <img20:Max> tag.

As illustrated with FIG. 10B and FIG. 10C, with the present embodiment, the information correlated with the <img20:Mode> tag is equivalent to insertion/retraction specification information.

Figure 11:
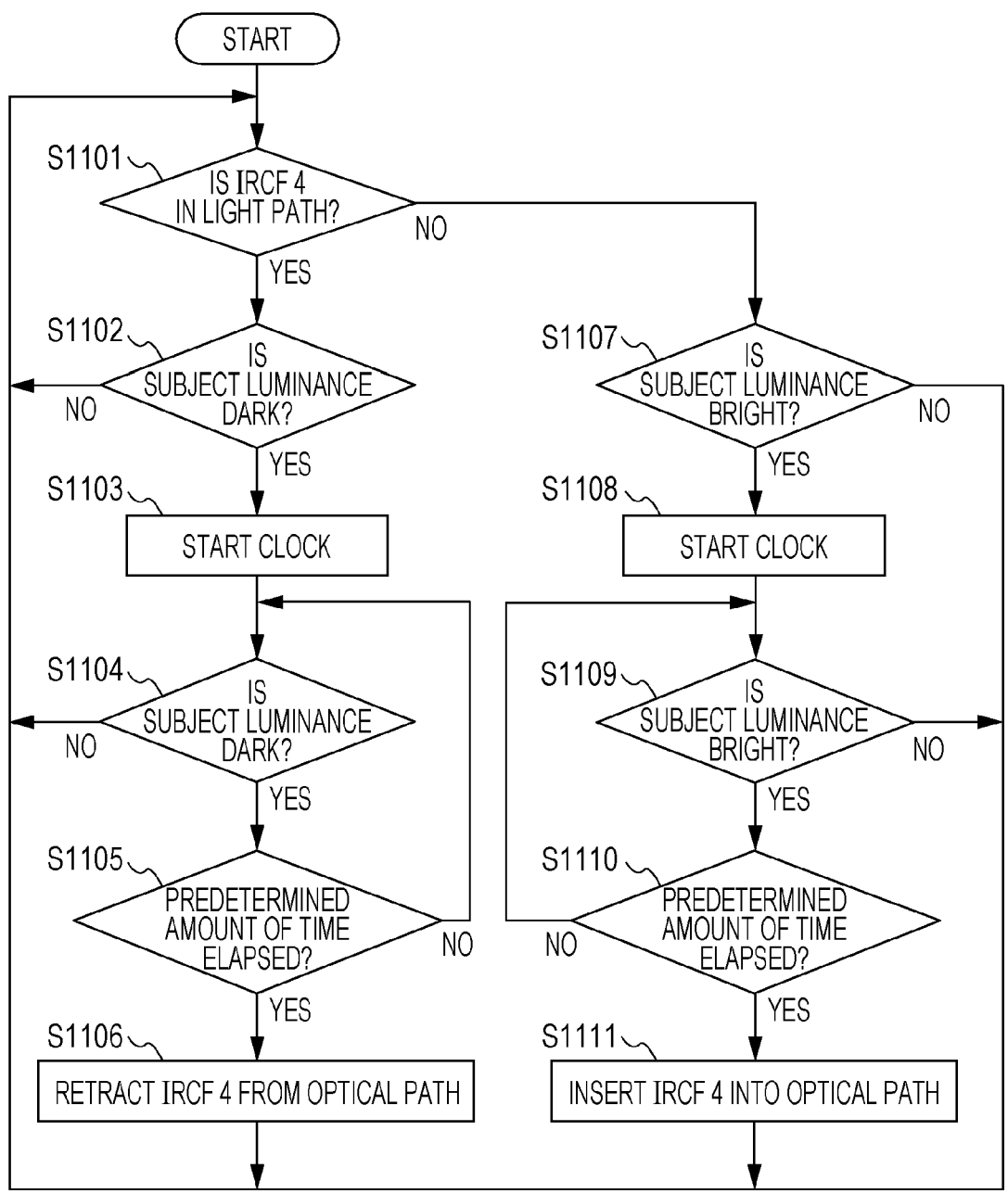
FIG. 11 is a flowchart for describing insertion and retraction control of an infrared cut filter by the imaging apparatus, according to an embodiment of the present invention.

Next, the insertion/retraction control of the IRCF 4 by the imaging apparatus according to the present embodiment will be described with reference to FIG. 11. FIG. 11 is a flowchart for describing the insertion/retraction control of the IRCF 4 by the imaging apparatus according to the present embodiment.

We will say that the imaging apparatus according to the present embodiment is the imaging apparatus assumed by FIG. 10C. We will also say that this imaging apparatus has received the SetImagingSettings command illustrated in FIG. 8G. Note that execution of the processing illustrated in FIG. 11 will be started by the CPU 26 after having received this SetImagingSettings command.

In step S1101, the CPU 26 determines whether or not the IRCF 4 has been inserted into the optical path of the imaging optical system 2. In the event of the CPU 26 determining that the IRCF 4 has been inserted into the optical path of the imaging optical system 2, the flow advances to step S1102. On the other hand, in the event of the CPU 26 determining that the IRCF 4 has not been inserted into the optical path of the imaging optical system 2, the flow advances to step S1107.

In step S1102, the CPU 26 determines whether or not the subject luminance is lower than a predetermined luminance threshold value. Specifically, the CPU 26 causes the determining circuit 20 to perform determination based on the subject luminance output from the luminance measurement circuit 18, and the value corresponding to the <BoundaryOffset> tag correlated with the <BoundaryType> tag of which the value has been set to ToOn.

For example, the CPU 26 reads from the EEPROM 28 the threshold value information corresponding to the value (0.16) of the <BoundaryOffset> tag correlated with the <BoundaryType> tag of which the value has been set to ToOn. Next, the CPU 26 sets the luminance threshold value indicated by the read out threshold value information to the determining circuit 20.

The determining circuit 20 then determines whether or not the subject luminance output from the luminance measurement circuit 18 is lower than the luminance threshold value set by the CPU 26.

In the event that the determining circuit 20 determines that the subject luminance output from the luminance measurement circuit 18 is lower than the luminance threshold value set by the CPU 26, the CPU 26 advances the flow to the processing in step S1103. On the other hand, in the event that the determining circuit 20 determines that the subject luminance output from the luminance measurement circuit 18 is not lower than the luminance threshold value set by the CPU 26, the CPU 26 returns the flow to the processing in step S1101.

In step S1103, the CPU 26 instructs the clock circuit 22 to start clocking. Specifically, the CPU 26 sets the clock circuit 22 to the value (1 minute 30 seconds) corresponding to the <ResponseTime> tag correlated with the <BoundaryType> tag of which the value has been set to ToOn, and starts clocking.

Step S1104 is the same as step S1102, so description will be omitted.

In step S1105, the CPU 26 determines whether or not a predetermined amount of time has elapsed after starting clocking in step S1103. Specifically, the CPU 26 determines whether or not a time elapsing signal has been input from the clock circuit 22.

In the event that a time elapsing signal has been input from the clock circuit 22, the CPU 26 determines that the predetermined amount of time has elapsed after starting clocking in step S1103, and advances the flow to the processing in step S1106. On the other hand, in the event that a time elapsing signal has not been input from the clock circuit 22, the CPU 26 determines that the predetermined amount of time has not elapsed after starting clocking in step S1103, and returns the flow to step S1104.

In step S1106, the CPU 26 instructs the IRCF driving circuit 24 to retract the IRCF 4 from the optical path of the imaging optical system 2. Note that the IRCF driving circuit 24 according to the present embodiment is equivalent to an insertion/retraction unit for performing insertion/retraction of the IRCF 4 to and from the optical path of the imaging optical system 2. Also, the CPU 26 according to the present embodiment is equivalent to a control unit automatically controlling the IRCF driving circuit 24.

In step S1107, the CPU 26 determines whether or not the subject luminance is higher than a predetermined luminance threshold value. Specifically, the CPU 26 causes the determining circuit 20 to perform determination based on the subject luminance output from the luminance measurement circuit 18, and the value corresponding to the <BoundaryOffset> tag correlated with the <BoundaryType> tag of which the value has been set to ToOff.

For example, the CPU 26 reads from the EEPROM 28 the threshold value information corresponding to the value (−0.62) of the <BoundaryOffset> tag correlated with the <BoundaryType> tag of which the value has been set to ToOff. Next, the CPU 26 sets the luminance threshold value indicated by the read out threshold value information to the determining circuit 20.

The determining circuit 20 then determines whether or not the subject luminance output from the luminance measurement circuit 18 is higher than the luminance threshold value set by the CPU 26.

In the event that the determining circuit 20 determines that the subject luminance output from the luminance measurement circuit 18 is higher than the luminance threshold value set by the CPU 26, the CPU 26 advances the flow to the processing in step S1108. On the other hand, in the event that the determining circuit 20 determines that the subject luminance output from the luminance measurement circuit 18 is not lower than the luminance threshold value set by the CPU 26, the CPU 26 returns the flow to the processing in step S1101.

In step S1108, the CPU 26 instructs the clock circuit 22 to start clocking. Specifically, the CPU 26 sets the value (1 minute 10 seconds) corresponding to the <ResponseTime> tag correlated with the <BoundaryType> tag of which the value has been set to ToOff, and starts clocking.

Step S1109 is the same as step S1107, so description will be omitted.

Step S1110 is the same as step S1105, so description will be omitted.

In step S1111, the CPU 26 instructs the IRCF driving circuit 24 to insert the IRCF 4 into the optical path of the imaging optical system 2.

Next, a case where the imaging apparatus according to the present embodiment is the imaging apparatus assumed by FIG. 10B will be described with reference to FIG. 11 as well. We will say that in this case, the imaging apparatus according to the present embodiment has received the SetImagingSettings command illustrated in FIG. 8C. Note that the following description of FIG. 11 will be made regarding only the points which differ from the description of FIG. 11 made above.

In step S1102, the CPU 26 determines whether or not the subject luminance is lower than a predetermined luminance threshold value. Specifically, the CPU 26 causes the determining circuit 20 to perform determination based on the subject luminance output from the luminance measurement circuit 18, and the value corresponding to the <BoundaryOffset> correlated with the <BoundaryType> tag of which the value has been set to Common.

For example, the CPU 26 reads the threshold value information corresponding to the value (0.52) of the <BoundaryOffset> correlated with the <BoundaryType> tag of which the value has been set to Common. Next, the CPU 26 sets the luminance threshold value indicated by the read out threshold value information to the determining circuit 20.

The determining circuit 20 then determines whether or not the subject luminance output from the luminance measurement circuit 18 is lower than the luminance threshold value set by the CPU 26.

In the event that the determining circuit 20 determines that the subject luminance output from the luminance measurement circuit 18 is lower than the luminance threshold value set by the CPU 26, the CPU 26 advances the flow to the processing in step S1103. On the other hand, in the event that the determining circuit 20 determines that the subject luminance output from the luminance measurement circuit 18 is not lower than the luminance threshold value set by the CPU 26, the CPU 26 returns the flow to the processing in step S1101.

In step S1103, the CPU 26 instructs the clock circuit 22 to start clocking. Specifically, the CPU 26 sets the value (1 minute 15 seconds) corresponding to the <ResponseTime> tag correlated with the <BoundaryType> tag of which the value has been set to Common, and starts clocking.

In step S1107, the CPU 26 determines whether or not the subject luminance is higher than a predetermined luminance threshold value. Specifically, the CPU 26 causes the determining circuit 20 to perform determination based on the subject luminance output from the luminance measurement circuit 18, and the value corresponding to the <BoundaryOffset> correlated with the <BoundaryType> tag of which the value has been set to Common.

For example, the CPU 26 reads the threshold value information corresponding to the value (−0.52) of the <BoundaryOffset> correlated with the <BoundaryType> tag of which the value has been set to Common Next, the CPU 26 sets the luminance threshold value indicated by the read out threshold value information to the determining circuit 20.

The determining circuit 20 then determines whether or not the subject luminance output from the luminance measurement circuit 18 is higher than the luminance threshold value set by the CPU 26.

In the event that the determining circuit 20 determines that the subject luminance output from the luminance measurement circuit 18 is higher than the luminance threshold value set by the CPU 26, the CPU 26 advances the flow to the processing in step S1108. On the other hand, in the event that the determining circuit 20 determines that the subject luminance output from the luminance measurement circuit 18 is not lower than the luminance threshold value set by the CPU 26, the CPU 26 returns the flow to the processing in step S1101.

In step S1108, the CPU 26 instructs the clock circuit 22 to start clocking. Specifically, the CPU 26 sets the value (1 minute 15 seconds) corresponding to the <ResponseTime> tag correlated with the <BoundaryType> tag of which the value has been set to Common, and starts clocking.

Note that as described with reference to FIG. 5, after having transmitted a GetOptionsResponse via network to an external client device, the imaging apparatus according to the present embodiment receives the following sort of command from this external client device via the network.

One example is a SetImagingSettings command in which the value of AUTO has been described as a value corresponding to the <IrCutFilter> tag, and also the <IrCutFilterAutoAdjustment> tag has been described. Further, note that the <BoundaryType> tag is described for this <IrCutFilterAutoAdjustment> tag.

As described above, with the present embodiment, one <BoundaryType> tag must be correlated with the <IrCutFilterAutoAdjustment> tag. Accordingly, with the present embodiment, the CPU 26 may be configured to perform the following determination in a case of having received a SetImagingSettings command including the <IrCutFilterAutoAdjustment> tag.

This determination is to determine whether or not one <BoundaryType> tag is included in the <IrCutFilterAutoAdjustment> tag included in the SetImagingSettings command. The CPU 26 may be configured such that, in the event that the CPU 26 determines that one <BoundaryType> tag is not included, the I/F 14 is controlled so as to return error information to the external client device as a response to this SetImagingSettings command.

Also, with the present embodiment, the CPU 26 of the imaging apparatus which has transmitted a GetOptionsResponse correlated with a <img20:Mode> tag of which Common has been correlated as the value to the external client device may be configured as follows. That is to say, the CPU 26 may be configured to perform the following determination in the event of having received a SetImagingSettings command including an <IrCutFilterAutoAdjustment> tag.

This determination is to determine whether or not the <IrCutFilterAutoAdjustment> tag included in the SetImagingSettings command includes a <BoundaryType> tag of which Common has been correlated as the value. The CPU 26 may be configured such that, in the event that the CPU 26 determines that this is not included, the I/F 14 is controlled so as to return error information to the external client device as a response to this SetImagingSettings command With the present embodiment, this CPU 26 is equivalent to a first determining unit.

Also, with the present embodiment, the CPU 26 of the imaging apparatus which has transmitted the GetOptionsResponse illustrated in FIG. 10C to the external client device may be configured as follows. That is to say, the CPU 26 may be configured to perform the following determination in the event of having received a SetImagingSettings command including an <IrCutFilterAutoAdjustment> tag.

This determination is to determine whether or not the <IrCutFilterAutoAdjustment> tag included in the SetImagingSettings command includes two <BoundaryType> tags. Specifically, these two <BoundaryType> tags are a <BoundaryType> tag to which ToOn has been correlated as a value, and a <BoundaryType> tags to which ToOff has been correlated as a value.

The CPU 26 may be configured such that, in the event that the CPU 26 determines that these are not included, the I/F 14 is controlled so as to return error information to the external client device as a response to this SetImagingSettings command With the present embodiment, this CPU 26 is equivalent to a second determining unit.

Also, with the present embodiment, the CPU 26 of the imaging apparatus which has transmitted the GetOptionsResponse illustrated in FIG. 10C to the external client device may be configured as follows. That is to say, the CPU 26 may be configured to perform the following determination in the event of having received a SetImagingSettings command including an <IrCutFilterAutoAdjustment> tag.

This determination is to determine whether or not the <IrCutFilterAutoAdjustment> tag included in the SetImagingSettings command includes a <BoundaryType> tag of which Common has been correlated as a value.

The CPU 26 may be configured such that, in the event that the CPU 26 determines that this is included, the I/F 14 is controlled so as to return error information to the external client device as a response to this SetImagingSettings command With the present embodiment, this CPU 26 is equivalent to a second determining unit.

Also, with the present embodiment, the CPU 26 of the imaging apparatus which has transmitted the GetOptionsResponse illustrated in FIG. 10B to the external client device may be configured as follows. That is to say, the CPU 26 may be configured to perform the following determination in the event of having received a SetImagingSettings command including an <IrCutFilterAutoAdjustment> tag.

This determination is to determine whether or not the <IrCutFilterAutoAdjustment> tag included in the SetImagingSettings command includes a <BoundaryType> correlated with a value other than Common. An example of a <BoundaryType> correlated with a value other than Common is a <BoundaryType> tag to which ToOn has been correlated as a value, and a <BoundaryType> tags to which ToOff has been correlated as a value.

The CPU 26 may be configured such that, in the event that the CPU 26 determines that this is included, the I/F 14 is controlled so as to return error information to the external client device as a response to this SetImagingSettings command.

Also, with the present embodiment, for the luminance threshold value settable to the imaging apparatus according to the present embodiment, the luminance threshold value is usually normalized to a value between −1.0 and 1.0, and is set by the external client. However, a situation can be conceived where a value other than the above range of values is set, due to trouble with the external client or the like. In order to handle such a case, in the event that a value other than the above range of values is set, the imaging apparatus according to the present embodiment rounds off this value to the settable upper limit value or lower limit value.

In the event that a value smaller than −1.0 is received as the BoundaryOffset value, such as −2.5 for example, the imaging apparatus according to the present embodiment uses −1.0 as this BoundaryOffset value. Also, in the event that a value greater than 1.0 is received as the BoundaryOffset value, such as 3.1 for example, the imaging apparatus according to the present embodiment uses 1.0 as this BoundaryOffset value.

Note that with the embodiment described above, a configuration is employed where, in the event that a value outside of the range of settable values is set, the imaging apparatus according to the present embodiment rounds off this value to the settable upper limit value or lower limit value, but this configuration is not restrictive.

For example, an arrangement may be made such that an error is returned to the SetImagingSettings command received form the external client. In this case, a response code to the effect that the BoundaryOffset value is invalid is described in the SetImagingSettingsResponse to be transmitted which the imaging apparatus according to the present embodiment returns.

Accordingly, with the present embodiment, a SetImagingSettingsResponse in which a response code to the effect that the BoundaryOffset value is invalid has been described is equivalent to error information. Note that here, error information is a response to the SetImagingSettings command in which the value of the IrCutFilter field has been set to Auto.

It can also be said that the IrCutFilterAutoAdjustment field according to the present embodiment is an optional parameter for adjusting the switching timing of the infrared cut filter.

Also, BoundaryType according to the present embodiment identifies which boundary parameters such as BoundaryOffset and ResponseTime for example, are used at. An identified boundary is a boundary at which to automatically switch the infrared cut filter, for example. Now, the value Common for the BoundaryType means that these parameters will be used not only for the boundary in a case of automatically switching the infrared cut filter to valid, but also for the boundary in a case of automatically switching the infrared cut filter to invalid. Also, the values ToOn and ToOff for BoundaryType each mean that these parameters will be used for one of the boundary in a case of automatically switching the infrared cut filter to valid, and the boundary in a case of automatically switching the infrared cut filter to invalid.

Also, the BoundaryOffset field according to the present embodiment adjusts the boundary exposure level for switching between valid (On) and invalid (Off) of the infrared cut filter, for example. The value of this BoundaryOffset field is a value normalized to between −1.0 to +1.0 for example, and has no unit. Further, the initial value of the BoundaryOffset field is 0, with −1.0 being the darkest and +1.0 being the brightest.

Note that the GetService command according to the present embodiment is a command to query the device which has received this command (e.g., the imaging apparatus according to the present embodiment) regarding the functions provided thereby. Also, Imaging Service according to the present embodiment is a service performing settings relating to imaging, such as exposure, shutter speed, vibration proofing, and so forth.

Also, the imaging apparatus and the client device according to the present embodiment save commands defined in XSD according to the present embodiment, in file format.

Also, we will say that an address indicating the Imaging Service of the imaging apparatus according to the present embodiment is the same as an address indicating the Video Analytics Service of the imaging apparatus, and an address indicating the PTZ Service of the imaging apparatus. However, this arrangement is not restrictive, and these addresses may be different from each other.

Also, the present invention may be realized by executing the following processing. That processing is to supply software (program) realizing the functions of the embodiment described above to a system or device via a network or various types of recording media, and a computer (or CPU, MPU, etc.) of the system or device reading out and executing the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

4 Infrared cut filter (IRCF) 18 Luminance measurement circuit 20 Determining circuit 14 Communication circuit (I/F) 22 Clock circuit 24 IRCF driving circuit 26 Central processing unit (CPU)

What is claimed is:

1. An imaging apparatus connected to a client device via a network, the imaging apparatus comprising:
an infrared cut filter configured to cut infrared light;
a toggling unit configured to toggle a state of the infrared cut filter between on and off;
a reception unit configured to receive, from the client device via the network, automatic adjustment information relating to the state of the infrared cut filter, along with an imaging setting command for the imaging apparatus to automatically control the state of the infrared cut filter;
a control unit configured to automatically control the toggling unit based on the imaging setting command received by the reception unit; and
a transmission unit configured to transmit setting information relating to the automatic adjustment information to the client device via the network,
wherein the setting information transmitted by the transmission unit indicates whether automatic adjustment information used by the control unit can be set in each of a case where the state of the infrared cut filter is turned on to enable the infrared cut filter or a case where the state of the infrared cut filter is turned off to disable the infrared cut filter.

2. The imaging apparatus according to claim 1, wherein the setting information indicates whether the automatic adjustment information used by the control unit can be individually set in each of a case where the state of the infrared cut filter is turned on and a case where the state of the infrared cut filter is turned off, or the automatic adjustment information can be set in common.

3. The imaging apparatus according to claim 2, wherein the setting information can be described first settable information to control the control unit in a case where the state of the infrared cut filter is turned on, and second settable information to control the control unit in a case where the state of the infrared cut filter is turned off, in that order.

4. The imaging apparatus according to claim 1, wherein, after the setting information is transmitted by the transmission unit, the reception unit receives, from the client device via the network, the automatic adjustment information along with the imaging setting command.

5. The imaging apparatus according to claim 1, wherein the reception unit receives parameters, relating to the setting information, along with the automatic adjustment information, from the client device via the network.

6. The imaging apparatus according to claim 1, further comprising:
 a first determining unit configured to determine whether the reception unit has received parameters along with the automatic adjustment information; and
 a reply unit configured to reply, in a case where the first determining unit determines that the reception has not occurred, error information as a reply to the imaging setting command received by the reception unit.

7. The imaging apparatus according to claim 6, further comprising a second determining unit configured to determine whether the parameters received by the reception unit and the setting information transmitted by the transmission unit agree,
 wherein the reply unit returns error information as a reply to the imaging setting command received by the reception unit in a case where the second determining unit determines that the received parameters and the setting information do not match.

8. The imaging apparatus according to claim 1, wherein the automatic adjustment information includes offset information relating to brightness of the subject.

9. The imaging apparatus according to claim 8, wherein a range of the offset information is restricted to a predetermined range.

10. The imaging apparatus according to claim 9, wherein the automatic adjustment information includes response time information relating to response time of toggling the state of the infrared cut filter.

11. A client device connected via a network to an imaging apparatus which includes an infrared cut filter configured to cut infrared light, a toggling unit configured to toggle a state of the infrared cut filter between on and off, and a control unit configured to automatically control the toggling unit, the client device comprising:
 a transmission unit configured to transmit, to the imaging apparatus via the network, automatic adjustment information relating to the state of the infrared cut filter, along with an imaging setting command for the imaging apparatus to automatically control the state of the infrared cut filter; and
 an acquisition unit configured to acquire, from the imaging apparatus via the network, setting information relating to the automatic adjustment information used by the control unit,
 wherein the setting information acquired by the acquisition unit indicates whether automatic adjustment information used by the control unit can be set in each of a case where the state of the infrared cut filter is turned on to enable the infrared cut filter or a case where the state of the infrared cut filter is turned off to disable the infrared cut filter.

12. The client device according to claim 11, wherein the setting information indicates whether the automatic adjustment information used by the control unit can be individually set in each of a case where the state of the infrared cut filter is turned on and a case where the state of the infrared cut filter is turned off, or the automatic adjustment information can be set in common.

13. The client device according to claim 12, wherein the setting information can describe first settable information to control the control unit in a case where the state of the infrared cut filter is turned on, and second settable information to control the control unit in a case where the state of the infrared cut filter is turned off, in that order.

14. The client device according to claim 11, wherein, after the setting information is acquired by the acquisition unit, the transmission unit transmits the automatic adjustment information along with the imaging setting command, to the imaging apparatus via the network.

15. The client device according to claim 14, wherein the transmission unit transmits parameters which corresponds to the setting information acquired by the acquisition unit.

16. The client device according to claim 11, wherein the transmission unit transmits, to the imaging apparatus via the network, parameters, relating to the setting information, along with the automatic adjustment information, to the imaging apparatus via the network.

17. The client device according to claim 11, wherein the automatic adjustment information includes offset information relating to brightness of the subject.

18. The client device according to claim 17, wherein a range of the offset information is restricted to a predetermined range.

19. The client device according to claim 18, wherein the automatic adjustment information includes response time information relating response time of toggling the state of the infrared cut filter.

20. An imaging system, comprising:
 an imaging apparatus having:
 an infrared cut filter configured to cut infrared light,
 a toggling unit configured to toggle a state of the infrared cut filter between on and off,
 a reception unit configured to receive, from a client device via a network, automatic adjustment information relating to the state of the infrared cut filter, along with an imaging setting command for the imaging apparatus to automatically control the state of the infrared cut filter, and
 a control unit configured to automatically control the toggling unit based on the imaging setting command received by the reception unit; and
 the client device connected to the imaging apparatus via the network and including:
 an acquisition unit configured to acquire setting information relating to the automatic adjustment information used by the control unit, from the imaging apparatus via the network,
 wherein the setting information acquired by the acquisition unit indicates whether automatic adjustment information used by the control unit can be set in each of a case where the state of the infrared cut filter is turned on to enable the infrared cut filter or a case where the state of the infrared cut filter is turned off to disable the infrared cut filter.

* * * * *